United States Patent
Yasuda et al.

(10) Patent No.: US 6,511,788 B1
(45) Date of Patent: Jan. 28, 2003

(54) MULTI-LAYERED OPTICAL DISC

(75) Inventors: Koichi Yasuda, Tokyo (JP); Kotaro Kurokawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/497,707

(22) Filed: Feb. 4, 2000

(30) Foreign Application Priority Data

| Feb. 12, 1999 | (JP) | 11-035086 |
| Feb. 12, 1999 | (JP) | 11-035087 |
| Mar. 9, 1999 | (JP) | 11-060986 |

(51) Int. Cl.$^7$ ............................................. G11B 7/24
(52) U.S. Cl. ................. 430/270.13; 430/945; 428/64.5; 369/284; 369/275.2; 369/275.5
(58) Field of Search .......................... 430/945, 270.13; 369/284, 275.2, 275.5; 428/64.5

(56) References Cited

U.S. PATENT DOCUMENTS

| 4,670,345 A | * | 6/1987 | Morimoto et al. ..... 430/270.13 |
| 4,769,311 A | * | 9/1988 | Terao et al. ............ 430/270.13 |
| 5,011,723 A | * | 4/1991 | Harigaya et al. ...... 430/270.13 |
| 5,298,305 A | * | 3/1994 | Shinozuka et al. .... 430/270.13 |
| 5,453,346 A | * | 9/1995 | Kawahara et al. .......... 430/945 |
| 5,569,517 A | * | 10/1996 | Tominaga et al. ..... 430/270.13 |
| 5,768,221 A | * | 6/1998 | Kasami et al. ............... 368/284 |
| 5,974,025 A | * | 10/1999 | Yamada et al. ............. 369/288 |
| RE36,383 E | * | 11/1999 | Yoshioka et al. ...... 430/270.13 |
| 6,190,750 B1 | * | 2/2001 | Wierenga et al. ......... 428/64.5 |

FOREIGN PATENT DOCUMENTS

| EP | 0762405 A2 | 3/1997 |
| EP | 0810590 A2 | 12/1997 |
| EP | 0847049 | * 6/1998 |
| EP | 0957477 | * 11/1999 |
| JP | 09-293271 | * 11/1987 |
| JP | 05-062249 | * 3/1993 |
| JP | 09-198709 | * 7/1997 |
| JP | 10-040581 | * 2/1998 |
| JP | 11-096594 | * 4/1999 |
| WO | PCT 97/14145 | 4/1997 |
| WO | WO 98/28738 | * 7/1998 |

* cited by examiner

*Primary Examiner*—Martin Angebranndt
(74) *Attorney, Agent, or Firm*—Sonnenschein, Nath & Rosenthal

(57) ABSTRACT

A multi-layered optical disc having its recording unit comprised of plural information recording layers, in which two or more information recording layers are layered on a substrate 0.3 to 1.2 mm in thickness, with the interposition of a transparent layer, to from a recording unit, a light transmitting protective layer is formed on the recording unit to a thickness of 10 to 177 μm, and in which the light is illuminated from the side of the light transmitting protective layer to effect recording and/or reproduction of information signals. At least one of the information recording layers except the information recording layer formed at a remotest position from the light transmitting protective layer has a phase change material as a recording material. A refractive index $nc_1$ and an extinction coefficient $kc_1$ in the crystallized state and a refractive index $na_1$ and an extinction coefficient $ka_1$ in the amorphous state of the phase change material constituting the first information recording layer as counted from the light transmitting protective layer satisfy the relationship of $(nc_1/na_1) \leq 12$, $(kc_1/ka_1) \leq 12$ and $(kc_1/ka_1) \leq 5 (nc_1/na_1)$, where the cases of $kc_1/ka_1 < 1$ and $nc_1/na_1 < 1$ are excluded.

20 Claims, 21 Drawing Sheets

H - L TYPE

L - H TYPE

| | |
|---|---|
| LIGHT TRANSMITTING LAYER | REFRACTIVE INDEX 1.57 |
| DIELECTRIC 1 10nm | REFRACTIVE INDEX 2.32 |
| PHASE CHANGE MATERIAL 8nm | REFRACTIVE INDEX : CRYSTAL 2.0-i3.0 AMORPHOUS 3.0-i2.0 |
| DIELECTRIC 2 100nm | REFRACTIVE INDEX 2.32 |
| INTERMEDIATE LAYER | REFRACTIVE INDEX 1.57 |

REFLECTANCE
 CRYSTAL 2.0%
 AMORPHOUS 9.1%

TRANSMITTANCE
 CRYSTAL 53.3%
 AMORPHOUS 51.1%

ABSORPTION RATE
 CRYSTAL 43.7%
 AMORPHOUS 39.8%

FIG.11

MULTI-LAYERED OPTICAL DISC

RELATED APPLICATION DATA

The present application claims priority to Japanese Application No. P11-035086 filed Feb. 12, 1999 which application is incorporated herein by reference to the extent permitted by law.

BACKGROUND OF THE INVENTION

1. Field of the Invention

This invention relates to a multi-layered optical disc having its recording unit comprised of plural information recording layers. More particularly, it relates to a multi-layered optical disc having its information recording layer formed of a phase change material.

2. Description of Prior Art

Recently, as so-called multi-media are becoming popular, a demand is raised for an optical recording medium handling a large volume of the information, such as a digital moving picture, such that the necessity of storing the large volume of the information and having a random access thereto as necessary for recording and/or reproduction is increasing.

Among the random-accessible recording mediums, there is an optical recording medium of a large storage capacity which is removable, that is can be taken out from the recording and/or reproducing apparatus. This optical recording medium is used in large quantities in many fields.

Under these circumstances, an optical recording medium on one surface of which recording and/or reproduction for four hours is possible in accordance with the NTSC (National Television System Committee) system.

In this optical recording medium, it is targeted to enable recording and/or reproduction for four hours, as a video disc player for home use, to provide a function as a new recording medium which takes the place of the video tape recorder now in prevalent use. Moreover, the optical recording medium may be of the same shape and size as the digital audio disc, having the music data recorded thereon, to prove a product more benign to a user accustomed to a digital audio disc.

Meanwhile, a demand is raised for an optical recording medium capable of handling a still larger information volume, such that the optical recording medium is required to have a still larger storage volume.

For example, the optical recording medium, capable of recording and/or reproduction in accordance with the NTSC system, is required not only to be in a disc shape to exploit the high accessing speed proper to the disc shape to provide a simple and small-sized recording medium, but also to be of a large storage capacity to have multiple functions such as instant reproduction of a recorded picture, trick play or editing.

In order to have these variegated functions, the capacity not less than 8 GB is required. However, there lacks up to now an optical recording medium capable of realizing this large storage capacity by the following reason:

In the already proposed replay-only DVD (digital versatile disc), the wavelength λ is 0.65 μm, with the numerical aperture NA of the optical system being 0.6, such that the recording capacity possible with the current DVD is not above 4.7 GB.

Thus, in order to provide a recording capacity not less than 8 GB, with the signal format of the DVD system, such as ECC (error correction code) or the modulation system, remaining unchanged, the following relation:

$$4.7 \times (0.65/0.60 \times NA/\lambda)2 \geq 8 \quad (1)$$

needs to be met.

From the equation (1), it is necessary that $NA/\lambda \geq 1.20$, such that a shorter wavelength or a larger magnitude of NA is required.

If the NA is of a larger magnitude, a transparent substrate of the optical disc, through which the illuminated reproducing light is transmitted, needs to be reduced in thickness. The reason is that, as NA is increased, the allowance for the aberration ascribable to an angle by which the disc surface deviates from the vertical with respect to an optical axis of the optical pickup, or the so-called tilt angle, becomes smaller, with the aberration ascribable to this tilt angle increasing with the increased thickness of the transparent substrate through which is transmitted the reproducing light.

By the same reason, variations in the thickness of the transparent substrate, through which is transmitted the reproducing light, need to be comprised within a pre-set range.

Meanwhile, an injection molded substrate, formed of plastics, is prevalently used as the transparent substrate for the optical recording medium. This injection molded substrate is difficult to manufacture with an extremely thin thickness and to a high accuracy.

On the other hand, the recording density of the information recording layer of an optical recording medium in an in-plane direction, that is in a two-dimensional direction, is determined by the minimum spot diameter of the laser light in use. Thus, the smaller the minimum spot diameter, the higher may be the density with which the signals are recorded. Therefore, in order to enable high density recording on an optical recording medium, it is attempted to reduce the wavelength of the light source and to increase the numerical aperture NA of the objective lens to reduce the minimum spot diameter. However, there is imposed a technical limitation in shortening the wavelength of the laser light or in increasing the numerical aperture NA of an objective lens, such that increasing the recording density in the two-dimensional direction is approaching its limit.

As means for increasing the recording capacity in an optical disc, there are such method as increasing the number of the recording layers, in addition to the methods of further reducing the recording and/or reproducing wavelength or improving the light converging power (NA) of the light used for recording and/or reproduction. In the write-once or overwrite optical disc, the preference is towards reducing the recording and/or reproducing wavelength and towards a higher NA of the objective lens, whilst multi-layered optical disc was first introduced in Society Publications only in October 1998.

The purport of this report was that recording and/or reproduction is possible in both the two phase change recording layers. It is however feared whether or not, if the information has been recorded on the light incident side recording layer (first recording layer), no information has been recorded on the first recording layer or if a recorded region and a non-recorded region co-exist in the first recording layer, recording can be made in stability in the other recording layer (second recording layer). In actuality, with the phase change recording material, it has been demonstrated that light transmittance of the first recording layer is higher in the recorded state, that is in the amorphous state, than in the non-recorded state, that is in the crystalline state, of the recording material. According to the reports, the light transmittance of the first recording layer is 70% and 45% in the crystalline state and in the amorphous state, respectively.

If the light transmittance of the first recording layer is varied appreciably before and after recording on this layer, it is necessary to record the information on the second recording layer after recording the information on the entire surface of the first recording layer. However, since signals cannot be recorded nor reproduced freely on each of the first and second recording layers, there are imposed severe limitations on the information exchange with the media, with the result that the merit proper to the multi-layered optical disc tends to be lost. Moreover, the transfer rate of the information recorded or reproduced on or from an optical disc recently is desired to be increased, so that an increasing demand is raised for simultaneously recording and/or reproducing plural recording layers of the multi-layered optical disc to increase the transfer rate by a factor corresponding to the number of the recording layers.

Moreover, if, in a recording and/or reproducing optical disc having layered information recording layers, the linear speed in raised by reducing the beam spot diameter, difficulties may be encountered in correctly recording the data, so that, if two information recording layers are layered, it has been difficult to realize the recording capacity not lower than 10 GB.

As discussed above, in an optical recording medium, further increase in the recording capacity represents one of incumbent technical tasks.

SUMMARY OF THE INVENTION

It is therefore an object of the present invention to provide a multi-layered optical disc in which the recording density can be increased in the three-dimensional direction and the recording capacity can be increased further and which is superior in recording and/or reproducing characteristics.

It is another object of the present invention to provide a multi-layered optical disc in which recording and/or reproduction can be performed simultaneously in stability in the respective recording layers of the recordable multi-layered optical disc.

It is yet another object of the present invention to provide a multi-layered optical disc which allows for rewriting and high density recording.

In one aspect, the present invention provides a multi-layered optical disc in which two or more information recording layers are layered on a substrate 0.3 to 1.2 mm in thickness, with the interposition of a transparent layer, to form a recording unit, a light transmitting protective layer is formed on the recording unit to a thickness of 10 to 177 $\mu$m, and in which the light is illuminated from the side of the light transmitting protective layer to effect recording and/or reproduction of information signals, wherein at least one of the information recording layers except the information recording layer formed at a remotest position from the light transmitting protective layer has a phase change material as a recording material, and wherein a refractive index $nc_1$ and an extinction coefficient $kc_1$ in the crystallized state and refractive index $na_1$ and an extinction coefficient $ka_1$ in the amorphous state of the phase change material constituting the first information recording layer as counted from the light transmitting protective layer satisfy the relationship of $(na_1/nc_1) \leq 12$, $(kc_1/ka_1) \leq 12$ and $(kc_1/ka_1) \leq 5$ $(nc_1/na_1)$, where the cases of $kc_1/ka_1 < 1$ and $nc_1/na_1 < 1$ are excluded.

In the above-described multi-layered optical disc, according to the present invention, in which the information recording layer is multi-layered, the recording density is increased even in the three-dimensional direction corresponding to the direction of thickness of the information recording layer, thus further increasing the recording capacity.

Moreover, in the multi-layered optical disc according to the present invention, at least one of the information recording layers except the information recording layer formed at a remotest position from the light transmitting protective layer has a phase change material as a recording material. Thus, the multi-layered optical disc of the present invention is able to record and/or reproduce the information repeatedly, whilst it is able to have plural layers capable of recording and/or reproduction.

Also, since the multi-layered optical disc according to the present invention is optically optimized with respect to the light with the wavelength of 380 to 450 nm, it is possible to realize a larger recording capacity.

In another aspect, the present invention provides a multi-layered optical disc in which two or more information recording layers are layered on a substrate 0.3 to 1.2 mm in thickness, with the interposition of a transparent layer, to form a recording unit, a light transmitting protective layer is formed on the recording unit to a thickness of 10 to 177 $\mu$m, and in which the light is illuminated from the side of the light transmitting protective layer to effect recording and/or reproduction of information signals, wherein each information recording layer has a phase change material as a recording material, and wherein, if, when the recording and/or reproducing light is converged on the second recording layer remote from the light transmitting protective layer, there co-exist an information recorded track and a non-information recorded track in the recording and/or reproducing light passage area in the first recording layer on the side of the light transmitting protective layer, the phase change recording material of the first recording layer satisfies the following relationship:

$$0.8 \leq T1c/T1a \leq 1.2$$

$$70\% \geq T1c \geq 40\%$$

$$70\% \geq T1a \geq 40\%$$

$$A1c/A1a \geq 1.0$$

where $T1c$ is the light transmittance of the phase change recording material of the first recording layer in the crystal state, $A1c$ is the absorption rate of light absorbed by the phase change recording material of the first recording layer in the crystal state, $T1a$ is the light transmittance of the phase change recording material in the amorphous state and $A1a$ is the absorption rate of light absorbed by the phase change recording material in the amorphous state.

In the above-described multi-layered optical disc, according to the present invention, in which the information recording layer is multi-layered, the recording density is increased even in the three-dimensional direction corresponding to the direction of thickness of the information recording layer, thus further increasing the recording capacity.

Moreover, since the multi-layered optical disc is optically optimized, recording and/or reproduction can be made in stability and simultaneously in respective recording layers.

In an information recording medium according to the present invention, a crystallization promoting film and an enhancement film are formed at least on the side of the supporting substrate or on the opposite side to the supporting substrate of the film of the phase change material, wherein the information recording layer closest to the supporting substrate has a reflecting film allocated to an outermost side thereof towards the supporting substrate and also has a semi-transparent enhancement film allocated to an outermost side thereof opposite to the supporting substrate, and wherein the crystallization promoting film is formed of a material containing at least one of Si, SiC, Ge, GeC, Sn, SnC, Al, AlC, Ga, GaC, In, InC, chlorides and oxides thereof.

In the above information recording medium, the enhancement film is formed of a material containing at least one of ZnS, ZnS—$SiO_2$, $SiO_2$ and $MgF_2$.

In the above information recording medium, the semi-transparent enhancement film is formed of a material containing at least one of Au, an AuCo alloy, Si, an Ag alloy, $SiO_x$, ZnS—$SiO_x$, an Au—$SiO_2$ mixture and an Au—ZnS—$SiO_2$ mixture.

In the configuration of the present invention, a crystallization promoting film and an enhancement film are formed at least on the side of the supporting substrate or on the opposite side to the supporting substrate of the film of the phase change material to constitute the information recording layers by the phase change material. Thus, the crystallization promoting film operates for crystallizing the amorphous portion, whilst the enhancement film operates for securing the light volume difference of the return light. It is noted that, since the information recording layer closest to the supporting substrate has a reflecting film allocated to an outermost side thereof towards the supporting substrate and also has a semi-transparent enhancement film allocated to an outermost side thereof opposite to the supporting substrate, the transmitted light can be effectively utilized by multi-path reflection on the information recording layer towards the supporting substrate side, where the incident light volume is minimum, thus correspondingly improving the sensitivity. Thus, if the information recording layer is multi-layered, it is possible to evade deterioration of the information recorded on the information recording layer to enable positive accessing to the lower layer side where the light volume is decreased. By forming the crystallization promoting film of a material containing at least one of Si, SiC, Ge, GeC, Sn, SnC, Al, AlC, Ga, GaC, In, InC, chlorides and oxides thereof, the amorphized phase change material can be easily melted and crystallized even if the beam spot diameter is reduced to increase the linear speed.

If, in the similar film structure, the enhancement film is formed of a material containing at least one of Au, an AuCo alloy, a SiAg allory, $SiO_x$, ZnS—$SiO_x$, an Au—$SiO_2$ mixture and an Au—ZnS—$SiO_2$ mixture, the light beam reflected by the reflecting layer can be re-reflected to increase the energy afforded to the crystallized portion which is in need of much energy for melting. Thus, if the amorphous portion and the crystallized portion co-exist, these portions can be melted evenly to re-record the desired information.

Also, by a similar film structure, the reflecting film can be fabricated from a material containing at least one of an Al alloy, BiSb, an Ag alloy, Au, an Au alloy, whereby it is possible to efficiently reflect and utilize the light beam transmitted through the information recording layer.

According to the present invention, as summarized above, a multi-layered optical disc can be furnished in which it is possible to increase the recording density in the three-dimensional direction and the recording capacity and which is superior in recording and/or reproducing characteristics.

Also, according to the present invention, both the first and second recording layers can be recorded and/or reproduced by providing the transmittance of the first recording layer of not less than 40% and by diminishing variations in the transmittance of the first recording layer at the time of recording and/or reproduction of the second recording layer.

If, when the first recording layer employs an overwritable phase change recording material, signals are previously recorded by the disc producer on the entire information recording area of the first recording layer, the transmittance of the first recording layer is rendered constant at the time of use of the disc by the user to enable stable recording and/or reproduction.

If, before and after information recording on the first recording layer, variations in the transmittance of the first recording layer are suppressed to be within the power margin of the second recording layer, information recording on the second recording layer can be performed in stability irrespective of the recording state on the first recording layer. In this case, it is unnecessary for the disc producer to pre-record the information, so that it becomes possible to suppress the production cost and the cost involved in media to raise the price competitiveness of the media.

Moreover, there is no necessity of imposing restrictions on the recording sequence for the first and second recording layers and hence the two recording layers can be recorded and/or reproduced simultaneously with the result that the transfer rate of the information for recording and/or reproduction can be twice that of the optical disc having only a sole recording layer. This enables real-time recording of the high-vision broadcast by the high transfer rate phase change optical disc.

By forming an anti-reflection film on the surface of the light transmitting layer, the recording and/or reproducing light can be focussed on the recording layer in stability without adding a mechanism of distinguishing the recording layer from the surface of the light transmitting layer to the recording and/or reproducing drive thus enabling the drive to be produced inexpensively.

Moreover, by layering the information recording layers of a phase change material, comprised of an enhancement film and a crystallization promoting film, forming the reflecting film on only the information recording layer closest to the supporting substrate and by suitably selecting the film materials of the respective information recording layers, such an optical information recording medium may be provided which is overwritable and on which recording can be made to high density.

DESCRIPTION OF THE DRAWINGS

FIG. 11 is a schematic view showing a further layered structure of a first recording layer.

DESCRIPTION OF THE PREFERRED EMBODIMENTS

Figure 1:
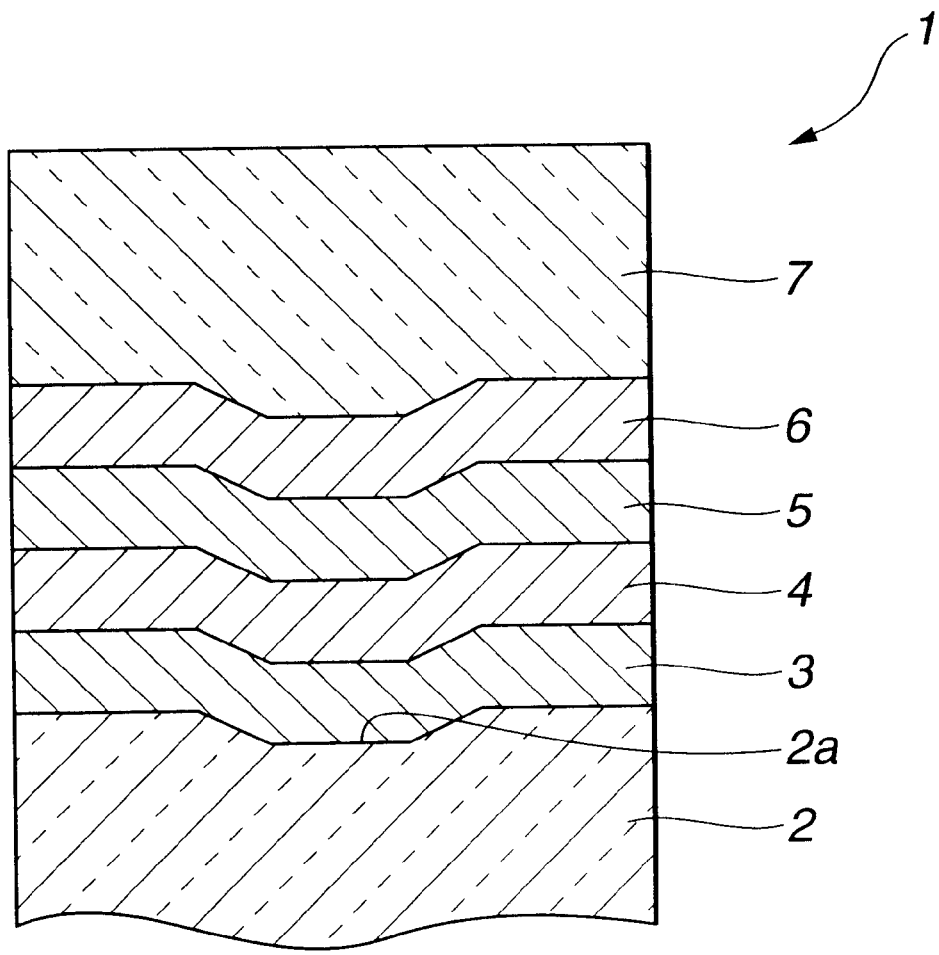
FIG. 1 is a schematic cross-sectional view showing an illustrative structure of a multi-layered optical disc.

Referring to the drawings, preferred embodiments of according to the present invention will be explained in detail.

A multi-layered optical disc, embodying the present invention, is comprised of a substrate, a recording section, comprised of two or more information recording layers, deposited thereon with interposition of a transparent layer (s), and a light transmission protective portion formed on the recording section. With the multi-layered optical disc, embodying the present invention, the laser light falls on the light transmission protective layer side to record and/or reproduce information signals.

In particular, with the multi-layered optical disc embodying the present invention, at least one of the two or more information recording layers, other than the information recording layer lying at the remotest position from the light transmission protective layer, is formed of a phase change material as a recording layer. That is, with the multi-layered optical disc according to the present invention, at least one of the information recording layers excepting the information recording layer formed at the closest position to the substrate is a phase change recording layer having the phase change material as the recording material. Of, course, in the multi-layered optical disc according to the present invention, the information recording layer, formed at the remotest position from the light transmission protective layer, that is at a position closest to the substrate side, may be a phase change recording layer.

In the following description, an optical disc, a recording section of which is formed by two information recording layers, is taken as an example of an multi-layered optical disc embodying the present invention. However, the present invention is not limited to this configuration. FIG. 1 shows a cross-section showing a multi-layered optical disc according to the present invention.

Referring to FIG. 1, the multi-layered optical disc 1 according to the present invention includes a light reflecting layer 3, a second information recording layer 4, a transparent layer 5, a first information recording layer 6 and a light transmission protective layer 7, sequentially layered on a major surface 2a of a substrate 2. In the present multi-layered optical disc 1, the laser light is illuminated from the light transmission protective layer 7 to record and/or reproduce information signals.

In more detail, if, in recording and/or reproducing information signals on or from the multi-layered optical disc 1 embodying the present invention, the laser light is focussed on the first information recording layer 6 as counted from the side of the light transmission protective layer 7, the laser light is not focussed on the second information recording layer 4, so that the information signals are recorded and/or reproduced only on or from the first information recording layer 6, as the first layer, which is in the laser light focussed state. On the other hand, if the laser light is focussed on the second information recording layer 4, the laser light is not focussed on the first information recording layer 6, so that the information signals are recorded and/or reproduced only on or from the second information recording layer 4, as the second layer, which is in the laser light focussed state.

In the present multi-layered optical disc 1, since the information recording layer is of a multi-layered structure, comprised of the first information recording layer 6 and the second information recording layer 4, and is in meeting with the following standard, the recording density may be higher in the three-dimensional direction, corresponding to the direction of thickness of the information recording layer, than in the conventional optical disc having a single recording layer, thus effectively realizing a further increased recording capacity.

The structure of the multi-layered optical disc 1, embodying the present invention, is explained in detail.

In general, the disc skew margin Θ, wavelength λ of the recording and/or reproducing system, numerical aperture NA of the objective lens and the thickness t of the light transmission protective layer, are correlated with one another. In particular, the relation between these parameters and the disc skew margin Θ, referred to below simply as skew margin, is shown in Japanese Laying-Open Patent H-3-225650, taking, as a reference, a compact disc CD, the practical validity or so-called playability of which has been proven sufficiently.

Specifically, the above publication indicates that it is sufficient if Θ≦±84.115°. This may apply to the multi-layered optical disc 1 according to the present invention.

If a specified limit value of the skew margin Θ in case of actual mass production of optical discs is taken into account, it is reasonably set to 0.4°. The reason is that, if the skew margin Θ is smaller than this value, the production yield is lowered in mass production to raise the cost. Meanwhile, in the pre-existing optical disc, this limit value is 0.6° and 0.4° for a CD and for a DVD, respectively.

Thus, with Θ=0.4°, how the thickness t of the light transmission protective layer 7 is to be set is calculated, taking into account the tendency towards the shorter wavelength of the laser light and the larger numerical aperture NA of the objective lens. First, with λ=0.65 μm, the NA value needs to be set to not less than 0.78 from the relation: NA/λ≧1.20.

If the wavelength of the laser light is shorter in future, such that λ=0.4 μm, and the condition of NA/λ≧1.20 is to be kept unchanged, the thickness t of the light transmission protective layer is t=1.77 μm. Therefore, the maximum thickness of the light transmission protective layer 7 of approximately 177 μm may be said to be preferred. If the possibility of utilizing a production equipment for a conventional CD, having the thickness of the substrate of 1.2 mm, for the production of the multi-layered optical disc 1, is taken into consideration, the thickness of the multi-layered optical disc 1 in its entirety is 1.38 mm at the maximum.

On the other hand, the lower limit of the thickness of the light transmission protective layer 7 is determined by whether or not the function of protecting the information recording layers 4, 6, reflecting layer 3 or the transparent layer 5 is assured. Specifically, the lower limit value is preferably not less than 10 μm if reliability of the optical disc 1 or the effect of collision of a two-set lens against the surface of the light transmission protective layer 7 is taken into consideration.

Whilst there is the aforementioned relation between the light transmission protective layer 7 and the skew margin Θ, if the possibility of accommodating up to the blue laser, estimated to be in wide use in future, from the current red laser, is taken into account, the thickness t of the light transmission protective layer 7 is desirably 10 to 177 μm.

Therefore, the thickness t of the light transmission protective layer 7 of 10 to 177 μm may be said to be preferred.

Also, for raising the recording density, as described above, it is mandatory to raise the ratio NA/λ.

The structure of the respective layers of the above-described multi-layered optical disc 1 is now explained in detail.

In a surface 2a of the substrate 2, there are formed micro-irregularities, such as guide grooves or pre-pits, in which to record signals, such as information signals. The thickness of the substrate 2 is preferably 0.3 to 1.2 mm. The material of the substrate 2 may be enumerated by, for example, plastics, such as polycarbonate, or acrylic resins, such as polymethacrylate (PMMA), or glass. In the former case, the substrate 2 is formed by injection molding and, in the latter case, the substrate 2 is molded by a photopolymer (2P) method.

The light reflecting layer 3, formed on the major surface 2a of the substrate 2, operates as a reflecting layer for reflecting the light transmitted through the first and second information recording layers 4, 6, while operating as a heat sink layer for prohibiting the heat from being stored excessively in the first and second information recording layers 4, 6.

The material of the light reflecting layer 3 is preferably a metal element, metalloid, a semiconductor element and a compound thereof, singly or in combination.

Of these, such a material is most preferred which is mainly composed of Al and which also contains 0.4 to 0.8 wt % of Si, not more than 0.7 wt % of Fe, 0.15 to 0.40 wt % of Cu, not more than 0.15 wt % of Mn, 0.8 to 1.2 wt % of Mg, 0.04 to 0.35 wt % of Cr, not more than 0.25 wt % of Zn and not more than 10.0 wt % of Ti. The light reflecting layer 3 in this case is formed as a thin film 50 to 200 nm in thickness.

The reason is that, if a phase change recording layer, formed of a phase change material, is layered on the light reflecting layer 3 as an information recording layer 4, this phase change recording layer is less susceptible to the crystalline properties of the light reflecting layer 3 or the shape of the interface formed by the particle size of the material of the light reflecting layer 3, as a result of which the phase change recording layer correctly reflects the surface shape of the substrate 2.

Among the methods for forming a light reflecting layer 3 on the substrate 2 by the above-mentioned materials, there is such method as ion beam sputtering method, dc sputtering method and RF sputtering method.

With the multi-layered optical disc embodying the present invention, a recording section, made up of two or more information recording layers, is formed on the light reflecting layer 3 formed on the substrate 2.

In particular, with the present multi-layered optical disc, the first information recording layer 6, as the first layer as counted from the side of the light transmission protective layer, is preferably the phase change recording layer. The reason is that the phase change material generally is high in light transmittance, so that, if this phase change material is used as the first information recording layer 6 which is the first layer as counted from the light transmission protective layer 7 illuminated by the light, light attenuation caused by transmission through the first information recording layer 6 can be suppressed only to a smaller value. The result is that the light of sufficient intensity is incident even on the second and following information recording layers as counted from the light transmission protective layer 7, whilst the reflected light of sufficient light intensity is also received from the second and following information recording layers.

In the multi-layered optical disc 1, embodying the present invention, the second information recording layer 4 and the first information recording layer 6 are layered via the transparent layer 5 on the light reflecting layer 3 formed on the substrate 2.

As discussed above, the multi-layered optical disc according to the present invention may be of three or more layers, instead of being of two layers.

Also, it is not mandatory that the totality of the information recording layers be phase change recording layers, it being only necessary if at least one information; recording layer other than the information recording layer remotest from the light transmission protective layer be a phase change recording layer. The information recording layer may also be a magneto-optical recording layer which loses its coercivity on temperature rise beyond the Curie temperature so as to be reversed in magnetization in the direction of an external magnetic field, or a replay-only recording section having pits on a substrate to present crevices and recesses and a metal reflecting film formed thereon. In this case, the magneto-optical recording layer is a film for perpendicular magnetic recording, exemplified by an amorphous alloy thin film, such as a Tb—Fe—Co film, exhibiting a Kerr effect or the Faraday effect.

It is noted that the first information recording layer 6 and the second information recording layer 4 are phase change recording layers formed of a phase change material as a recording material. In the case of the two-layered disc 1, it suffices if the first information recording layer 6 is a phase change recording layer, while it is not mandatory for the second information recording layer 4 to be a phase change recording layer.

As the phase change material, used for this recording material, such a material as undergoes phase change between the crystalline state and the amorphous state is used. In this type of the phase change recording layer, a recording pit is formed, as an example, as follows:

That is, if the phase change recording layer is formed by a sputtering method, the film as formed presents an amorphous state. This phase change recording layer in the amorphous state is first heated to a temperature not lower than the crystallization temperature for phase transition to a crystalline state (initialization).

If, in this state, the laser light is illuminated from, for example, the light transmission protective layer 7, phase change occurs from the crystalline state to an amorphous state, in the area on which has been converged the laser light, so that reflectance is changed in this area. The portion where the reflectance has changed proves a recording pit. This recording pit is detected by exploiting the differential in reflectance between an area where the pit has been formed and an area where the pit has not been formed.

In selecting this type of the phase change material, attention should be directed to the following points.

First, the material needs to be such material which is less susceptible to changes in the composition or segregation such as phase separation and which is crystallized to form crystals of a smaller number of crystal types. Also, such a material is to be used which is in an optimum range of the melting point, crystallization temperature or the crystallization speed.

That is, the melting point of the phase change material is desirably not higher than 700° C. In order for the film of the phase change material to be changed in phase to an amorphous state, this film of the phase change material needs to be heated to not less than its melting point. Therefore if the melting point of the phase change material is too high, thermal loads are imposed on the light transmission protective layer 7, transparent layer 5 or on the substrate provided in adjacency or in proximity to the phase change recording layer.

The crystallization temperature of the phase change material is preferably not less than 150° C. If the crystallization temperature of the phase change material is too low, the recording pit is inferior in thermal stability, thus lowering the information storage reliability.

The crystallization speed of the phase change material is desirably not higher than 500 nsec. The linear speed of the optical disc is 2 to 20 m/sec, whereas the spot diameter of a laser light spot on the disc surface is on the order of 1 $\mu$m. Therefore, the time length the laser light is illuminated on a given spot on a phase change recording layer is 50 to 500 nsec. In order for phase change to occur during this short illuminating time, the crystallization speed of the phase change material needs to be not higher than 500 nsec.

The phase change material preferably contains at least one of Au, Al, Ag, Bi, Cu, Cr, Co, Cd, Ce, Cs, Dy, Fe, Ge, Gd, Ga, Hf, In, K, La, Li, Mn, Mo, Ni, Nb, Nd, Na, Os, Pd, Pr, Pb, Ru, Rh, Rb, Sn, Si, Sm, Sc, Se, Te, Ti, Tb, Ta, Ti, V, W, Y, Zn and Zr. Such material may be enumerated by InSe based chalcogenides, SbSe based chalcogenides, InSbSe chalcogenides, GeSbTe based chalcogenides, GeSbTeSe based chalcogenides, GeSbTe based chalcogenides, AgInSbTe based chalcogenides and AgInSbSeTe based chalcogenides and AgInSbTeN based chalcogenides. In particular, in the first information recording layer 6, as the first layer as counted from the light transmission protective layer 7, the above-mentioned chalcogenide is preferably used as the phase change material in view of optical conditions, such as light transmittance or reflectance.

Specific examples of the phase change material include $Sb_2Se_3$, $Ge_2Sb_2Te_5$, having a melting point of 600° C., crystallization temperature of 172° C. and the crystallization speed of 50 nsec, and $TeO_x$ (0<x<2).

The phase change material may also be one of InSeN, InSeNO, InSeO, SbSeN, SbSeNO, SbSeO, InSbSeN, InSbSeNO, InSbSeO, GeSbTeSeN, GeSbTeSeNO, GeSbTeSeO, AgInSbSeTeN, AgInSbSeTeNO, AgInSbSeTeO, GeSbTeNO, GeSbTeO, AgInSbTeNO and AgInSbTeO.

Of these, $TeO_x$ is relatively stable in its crystalline state such that it is meritorious in assuring thermal stability of a recording pit. The aforementioned Se based chalcogenide added to with Si is also desirable in view of its relatively fast crystallization speed.

If, in a multi-layered optical disc, the above-mentioned phase change materials are used as the recording material for the information recording layer, it is crucial to take into account the relation between the optical performance of the information recording layer and the position of the information recording layer in the recording section.

That is, the multi-layered optical disc, the second information recording layer, as counted from the light transmission protective layer on which falls the laser light, or the nth information recording layer, spaced from the light transmission protective layer by two or more layers, is illuminated by the laser light transmitted through (n−1) information recording layers closer than the nth information recording layer to the light transmission protective layer. Also, the light reflected by the nth information recording layer is transmitted through the (n−1) information recording layers so as to be received by a light receiving section.

Thus, the intensity of the laser light illuminated on an information recording layer or the intensity of the light reflected from this information recording layer is affected by optical characteristics of the information recording layers lying closer than the information recording layer to the light transmission protective layer. Thus, it is necessary for the information recording layers lying towards the light transmission protective layer to have reflectance sufficient to provide a sufficient amplitude of the playback signal and light transmittance.

In particular, the first information recording layer as counted from the light transmission protective layer is required to meet stringent requirements since it needs to exhibit reflectance sufficient to assure reproduction and high light transmittance.

On the other hand, with the information recording layer remoter from the light transmission protective layer, it is crucial that the reflectance and light absorption rate be high to assure formation of a recording pit even with the light of relatively low intensity, and that the reflectance and the light absorption rate be high to assure a sufficient amplitude of the playback signals from the recording pit. It is necessary to take these into consideration in designing the configuration of the recording section.

Thus, in the multi-layered optical disc, the first information recording layer 6, as the first layer as counted from the light transmitting layer 7, needs to be of sufficient reflectance to permit reproduction and of sufficient light transmittance.

On the other hand, the second information recording layer 4 remoter from the light transmission protective layer 7 in the multi-layered optical disc 1 needs to be high in reflectance and light absorption rate, in order to assure recording and/or reproduction even with the light of lower intensity.

Specifically, if a multi-layered optical disc 1, the recording section of which is constituted by two phase change recording layers, formed of a phase change material as a recording material, is taken as an example, the reflectance $Rc_1$ and light transmittance $Tc_1$ in the crystalline state, and the reflectance $Ra_1$ and the light transmittance $Ta_1$ in the amorphous state, of the first information recording layer 6, as counted from the light transmission protective layer 7, with respect to the recording and/or reproducing light, desirably meet the following conditions:

$Rc_1 \geq 5\%$
$Rc_1/Ra_1 \geq 1.5$
$Tc_1, Ta_1 \geq 20\%$
or
$Ra_1 \geq 5\%$
$Ra_1/Rc_1 \geq 1.5$
$Tc_1, Ta_1 \geq 20\%$.

On the other hand, in the second information recording layer 4, as the second recording layer as counted from the light transmission protective layer 7, the reflectance $Rc_2$ and light transmittance $Tc_2$ in the crystalline state, and the reflectance $Ra_2$ and the light transmittance $Ta_2$ in the amorphous state, of the first information recording layer 6, as counted from the light transmission protective layer 7, with respect to the recording and/or reproducing light, desirably meet the following conditions:

$Rc_2 \geq 5\%$
$Rc_2/Ra_2 \geq 1.5$
$Tc_2, Ta_2 \geq 60\%$
or
$Ra_2 \geq 10\%$
$Ra_2/Rc_2 \geq 1.5$
$Tc_2, Ta_2 \geq 60\%$.

With the first information recording layer 6, as the first recording layer as counted from the light transmission protective layer 7, the reflectance $Rc_1$ in the crystalline state and the reflectance $Ra_1$ in the amorphous state are set in light of the amplitude of the playback signal, such that, if $Rc_1$ and $Ra_1$ are outside the above range, the amplitude of the playback signal obtained from the first information recording layer 6 falls short.

In this first information recording layer 6, the light transmittance $Tc_1$ in the crystalline state and the light transmittance $Ta_1$ in the amorphous state are determined in association with suppression of the laser light caused by the transmission of the laser light through the first information recording layer 6. If $Tc_1$ and $Ta_1$ are outside the above range, the laser light is attenuated in intensity as a result of transmission of the laser light from the light transmission protective layer 7 through the first information recording layer 6, such that the laser light cannot be illuminated with sufficient intensity from the light transmission protective layer 7 to the second information recording layer 4 as the second layer as counted from the light transmission protective layer 7, as a result of which the light reflected from the second information recording layer 4 cannot be received with sufficient intensity. This renders formation and detection of the recording pit difficult in the second information recording layer 4 corresponding to the second layer.

On the other hand, in the second information recording layer 4, as the second recording layer as counted from the light transmission protective layer 7, the light absorption rate $Ac_2$ in the crystalline state and the light absorption rate $Aa_2$ in the amorphous state are set so as to cause phase changes even with a lower laser light intensity.

Also, in the second information recording layer 4, as the second recording layer, the reflectance $Rc_2$ in the crystalline state, and the reflectance $Ra_2$ in the amorphous state are determined in light of the amplitude of the playback signal, such that, if $Rc_2$ and $Ra_2$ are outside the above range, the amplitude of the playback signal obtained from the second information recording layer 4 as the second recording layer falls short.

The optical characteristics of these recording layers depend on the layered structure of the recording layers, that is on the conjoint use of dielectric and reflecting layers, refractive index n of the phase change material used as the recording material, and on the extinction coefficient k.

Figure 2:
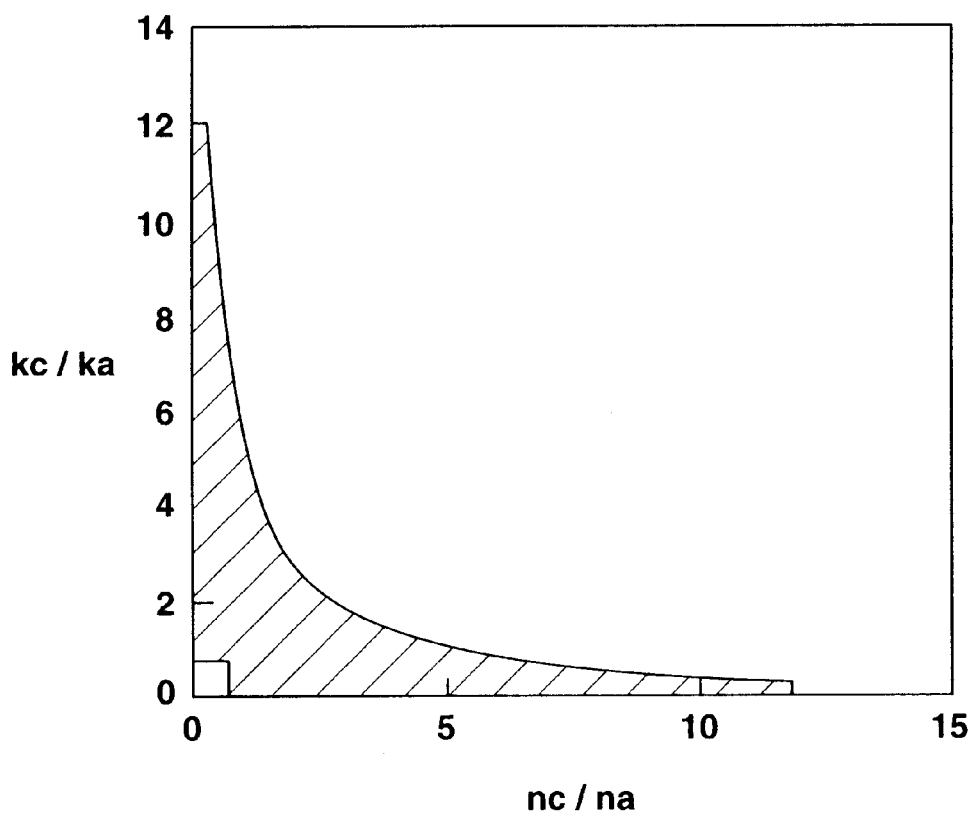
FIG. 2 is a graph showing a region for realization of pre-set optical characteristics.

FIG. 2 shows a graph in which $nc_1$, $na_1$, $kc_1$ and $ka_1$ of a variety of phase change materials are plotted, with $nc_1/na_1$ on the abscissa and with $kc_1/ka_1$ on the ordinate.

Irrespective of whether the wavelength of the recording and/or reproducing light is 650 nm or 400 nm, the tendency is approximately the. same, such that it has become possible to realize the above-mentioned optical characteristics in an area shown shaded in the drawing.

That is, in the present invention, the refractive index $nc_1$ and the extinction coefficient $kc_1$ in the crystalline state and the refractive index $na_1$ and the extinction coefficient $ka_1$ in the amorphous state of the phase change material constituting the first information recording layer as counted from the light transmission protective layer are set to satisfy the relation such that $(nc_1/na_1) \leq 12, (kc_1/ka_1) \leq 12$ and $(kc_1/ka_1) \leq 5/(nc_1/na_1)$, where $kc_1/ka_1 < 1$ and $nc_1/na_1 < 1$ are excluded.

A multi-layered optical disc is now explained, in which changes in the light transmittance of the first recording layer for the light incident side recording and/or reproducing light are diminished before and after recording the information in the first recording layer to assure stable information recording and/or reproduction on or from the second information recording layer as well as to enable concurrent information recording and/or reproduction on the first and second recording layers.

The phase change optical disc exploits the fact that the difference in the complex refractive index of the recording material is increased when the recording material is in the crystalline and amorphous states. By setting an information unrecorded portion and an information recorded portion to the crystalline state and to the amorphous state, respectively, the difference in the reflectance to the recording and/or reproducing light to these regions is created for discriminating the presence or absence of the recorded information. Also, the crystalline state can be created by cooling the phase change material relatively slowly. It is an initializing device used in the field of the phase change optical disc that exploits this principle. The amorphous state can be created by cooling relatively rapidly. It is a drive used for information recording and/or reproduction that exploits this principle.

Figure 3:
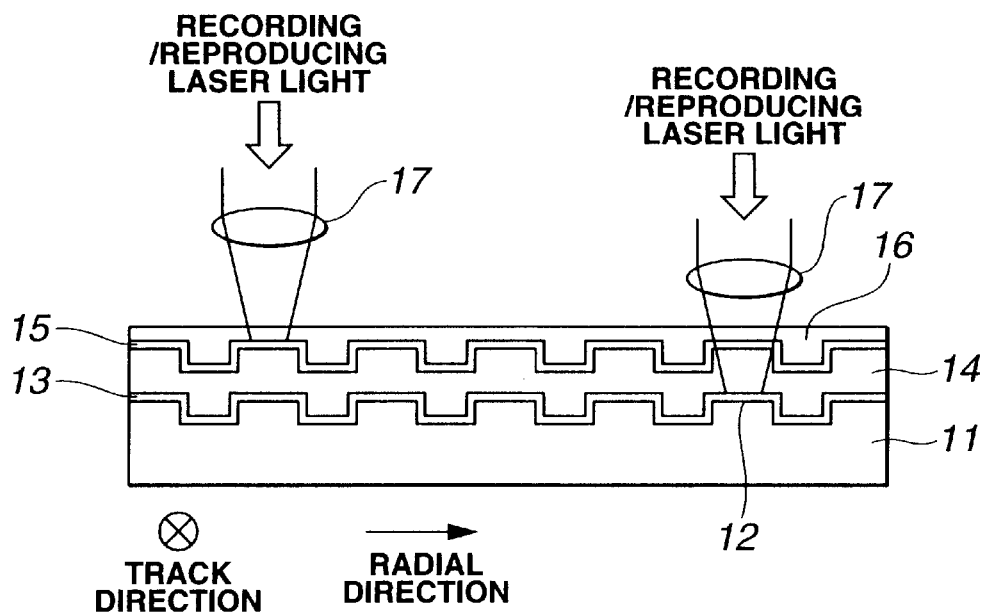
FIG. 3 is a schematic view showing a basic structure and the manner of light incidence in a double-layer optical disc.

FIG. 3 shows the basic structure of the two-layer optical disc and the method of causing the recording and/or reproducing light to fall on the optical disc.

This multi-layered optical disc includes a supporting substrate 11 of a thermoplastic resin, 0.3 to 1.2 mm thick, and a circumferentially spirally extending guide groove 12 formed therein. On the guide groove 12 is formed a first recording layer 15, having a guide groove structure, via a transparent intermediate layer 14, approximately 30 μm in thickness, with a transparent light transmitting layer 16 being formed thereon to thickness of the order of 100 μm. The wavelength of the laser light used for recording and/or reproduction is of the order of 650 nm or 400 nm, whilst the numerical aperture NA, representing the light converging power of an objective lens 17, is set to 0.85. The diameter of the light converged on the recording layer is of the order of 0.9 μm and 0.6 μm, for the wavelengths of 650 nm and 400 nm, respectively. The information is to be recorded in both the guide groove portion convexed with respect to the incident light and the guide groove portion concave with respect to the incident light, respectively.

In converging the recording and/or reproducing light on the recording layer, the laser light used for the recording and/or reproduction is converged by being transmitted through the objective lens used for converging this recording and/or reproducing light. The converged light is incident on and transmitted through the light transmitting layer 16 of the double layer optical disc so as to be focussed on the first information recording layer 15. The converged light further is transmitted through the first information recording layer 15 and through the intermediate layer 14 so as to be focussed on the second information recording layer 13. For focussing the light on the first recording layer 15 and on the second information layer 13, a sole objective lens may be used, in which case the objective lens is moved along the optical axis. Alternatively, two different objective lenses and laser light beams paired to the objective lenses may be used, in which the laser light beams are focussed on respective recording layers.

The light reflectance, light transmittance and the light absorption rate in the first and second recording layers in the optical disc are defined in the following manner.

Figure 4:
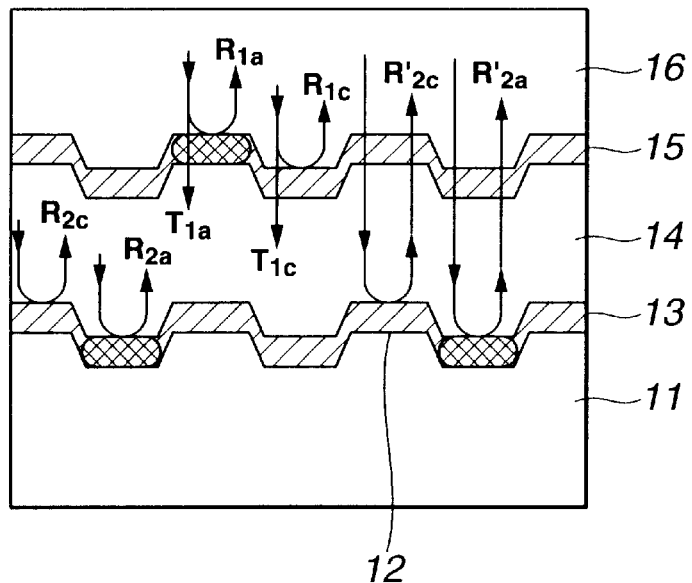
FIG. 4 is a schematic view for illustrating the definition of reflectance and transmittance of first and recording layers of a double-layer optical disc.

In FIG. 4, there are shown definitions of the reflectance and the transmittance in the respective layers of the incident light in the interior of the multi-layered optical disc. R1c is the reflectance of the light incident on the first recording layer 15, whilst T1c is the transmittance in the first recording layer 15 in this case. R1a is the reflectance of light incident on the first recording layer 15 in case the recording material of the first recording layer 15 is in the crystallized state and T1a is the light transmittance in the first recording layer 15 in this case. A1c, A1a denote proportions of light incident on the second recording layer 14 and absorbed by the recording materials.

R2c is the reflectance of light incident on the second recording layer 13 in case the recording material of the second recording layer 13 is in the crystallized state and R2a is the reflectance of light incident on the second recording layer 13 in case the recording material of the second recording layer 13 is in the amorphous state. A2c, A2a denote proportions of light incident on the second recording layer 13 and absorbed by the recording materials.

R'2c denotes the proportion to the volume of the incident light on the light transmitting layer of the volume of the light incident transmitted through the first recording layer 15, reflected by the second information layer 13, again transmitted through the first recording layer 15 and returned to the light transmitting layer when the recording material of the second information layer 13 is in the crystalline state. On the other hand, R'2a denotes the proportion to the volume of the incident light on the light transmitting layer of the volume of the light incident transmitted through the first recording layer 15, reflected by the second information layer 13, again transmitted through the first recording layer 15 and returned to the light transmitting layer when the recording material of the second information layer 13 is in the amorphous state.

In the overwrite phase change optical disc, $Ac/Aa \geq 1.0$ is said to be preferred. This value affects the information rewriting characteristics, such that a larger value of this ratio may be said to be preferred. If the information is recorded on the already existing recording marks, the higher the value of this ratio, the more effectively the already existing marks are erased, that is crystallized, under a principle termed a pre-crystallization.

On the other hand, there is such laser light, with a wavelength of 660 nm, used for recording and/or reproduction, that is able by itself to develop a dc power of 50 mW, or 70 mW as a pulse. By employing such laser light, a maximum pulse output of 10 mW may be realized on light radiation from the objective lens.

Figure 5:
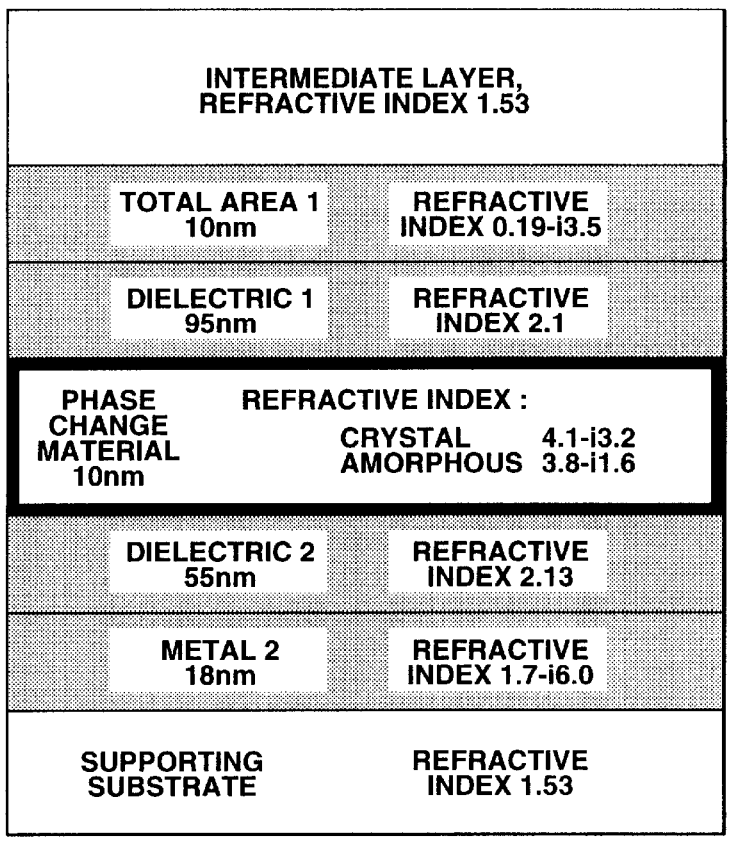
FIG. 5 is a schematic view showing a layered structure of a second recording layer.

In the present embodiment, the second information layer 13, configured as shown in FIG. 5, has the reflectance of 33.5% and a recording power of 7 mW for the laser wavelength of 650 nm. The allowance of the variations of the recording power, that is the power margin, is ±20% relative to the center power.

Turning to the range of transmittance of the first recording layer 15, if a volume of light sufficient to effect recording and/or reproduction of the second information layer 13 is to reach to the second information layer 13, the transmittance of the first recording layer 15 of 40% is required at the minimum. On the other hand, the upper limit of the transmittance of the first recording layer 15 is determined in order for the first recording layer 15 to be recordable. If the recording power currently available is taken into consideration, the light transmittance of 70%, the light absorption rate of 20% and the light reflectance of 10% of the first recording layer 15 are obtained, this value of 70% being an upper limit of the light transmittance. Thus, the range of transmittance of the first recording layer 15 is given by $$70\% \geq T1c \geq 40\%$$

and $$70\% \geq T1a \geq 40\%.$$

The information recording conditions for the laser wavelength of 650 nm include the recording linear speed of not lower than 6 m/sec, a recording linear speed of not higher than 0.23 μm/bit, with the information volume for the two-layer disc being not less than 17 Gbyte and the transfer rate being not less than 26 Mbps (raw data).

For the laser wavelength of 400 nm, the information recording conditions include the recording linear speed of not lower than 6 m/sec and a recording linear speed of not higher than 0.14 μm/bit, with the information volume for the two-layer disc being not less than 34 Gbyte and the transfer rate being not less than 42 Mbps (raw data).

Similar discussions may, of course, be made for an optical disc having the NA of 0.6 and the light transmitting layer of the order of 0.6 mm, such as DVD.

If the first recording layer is formed of a overwritable phase change recording material and signals not having the meaning as the information is pre-recorded by a producer on the entire surface of the information recording area, the areal ratio between the crystalline area and the amorphous area in the first recording layer is not changed before and after the recording on the first recording layer when the user uses the disc, such that the second recording layer can perpetually be recorded and/or reproduced in stability.

Figure 6:
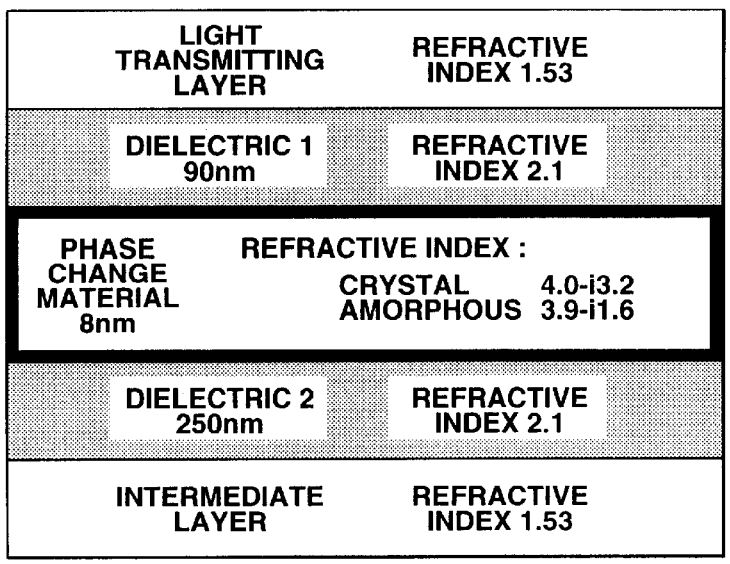
FIG. 6 is a schematic view showing a layered structure of a first recording layer.

FIG. 6 shows an example of a recording layer configuration for realization of the first recording layer. Since here the land/groove recording is presupposed, the areal ratio between the crystalline area and the amorphous area in the first recording layer is not changed after the recording, so that the light transmittance in the first recording layer when the recording and/or reproducing light is focussed on the second recording layer is 59.8%.

Figure 7:
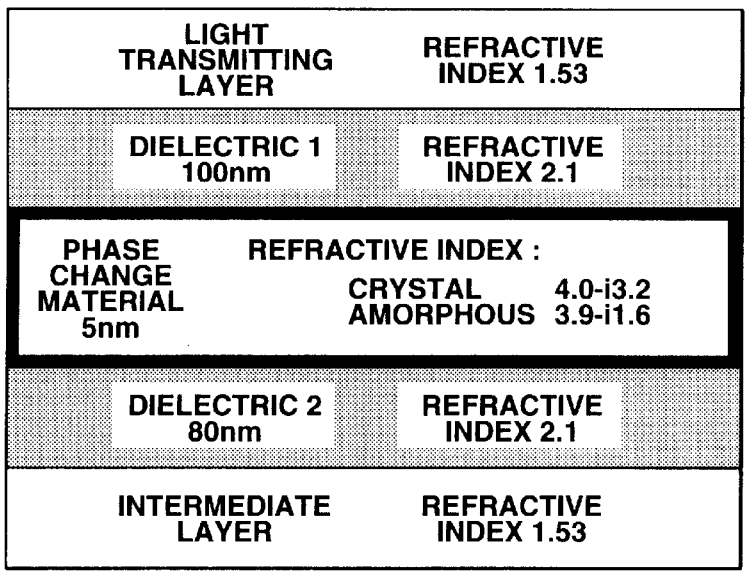
FIG. 7 is a schematic view showing another layered structure of a first recording layer.
Figure 8:
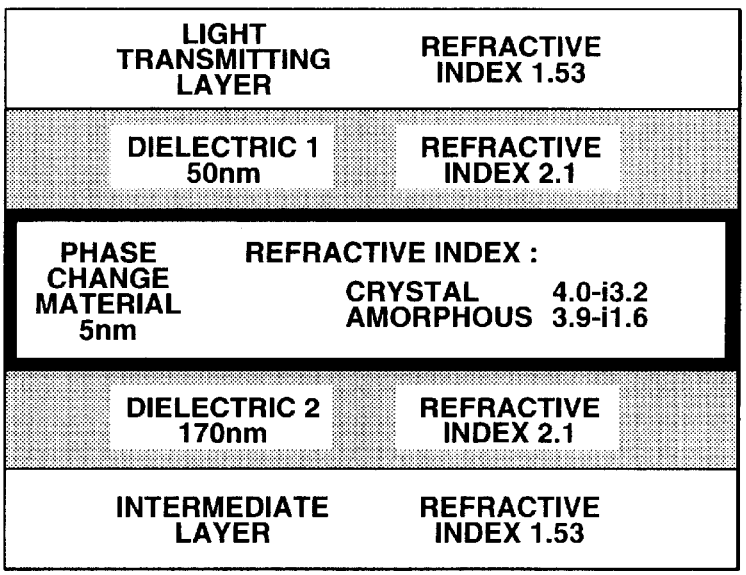
FIG. 8 is a schematic view showing still another layered structure of a first recording layer.
Figure 9A:
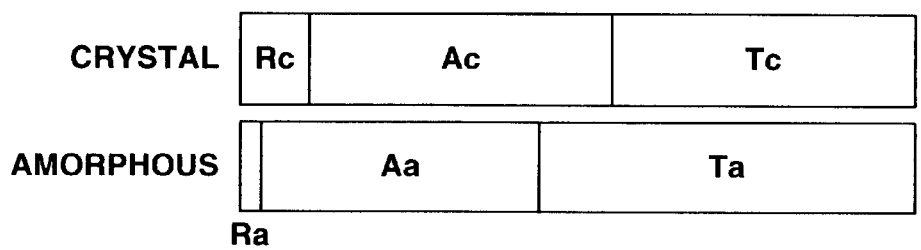
FIG. 9 is a schematic view for illustrating light energy distribution in the H-L type and in the L-H type.
Figure 9B:
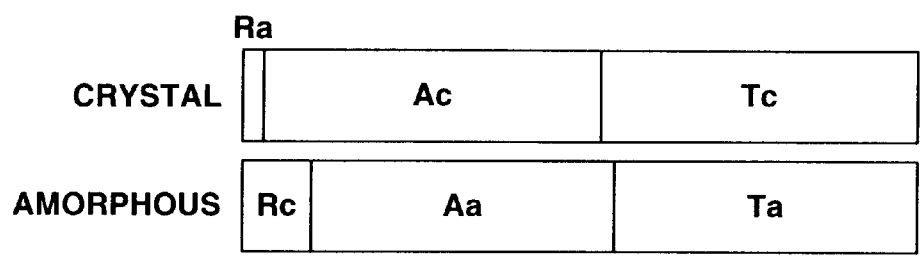

FIGS. 7 and 8 show other illustrative structures of the first recording layer. The recording and/or reproducing wavelength is presupposed to be 650 nm. FIGS. 7 and 8 show an instance where the reflectance change before and after recording is so-called high to low, referred to herein as H-L, and an instance where the reflectance change before and after recording is so-called low to high, referred to herein as L-H. FIG. 9 shows light energy distribution between H-L type and the L-H type. Here, the following relation is to be met:

Film structure of FIG. 7

$$0.8 \leq Tc/Ta = 0.80 \leq 1.2$$

$$70\% \geq T1c = 63.3\% \geq 40\%$$

$$70\% \geq T1a = 79.1\% \geq 40\%$$

$$Ac/Aa = 1.69 \geq 1.0;$$

Film structure of FIG. 8

$$0.8 \leq Tc/Ta = 0.81 \leq 1.2$$

$$70\% \geq T1c = 54.9\% \geq 40\%$$

$$70\% \geq T1a = 68.1\% \geq 40\%$$

$$Ac/Aa = 1.70 \geq 1.0.$$

Figure 10:
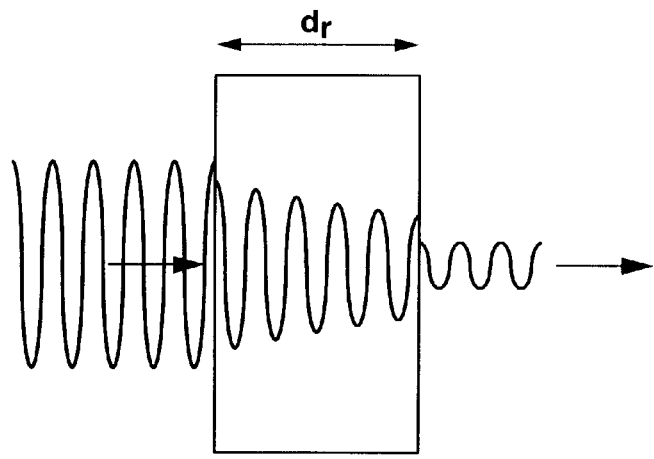
FIG. 10 is a schematic view showing how the light proceeds in an absorptive medium.

If, in attempting to satisfy the optical characteristics prescribed by the present invention, the transmittance of the light incident on the first recording layer is to be not less than 40%, the energy of the light to be absorbed by the recording material evidently needs to be 60% or less. FIG. 10 show changes in the energy of light transmitted through a material having an absorption coefficient for light. The absorption coefficient for the light incident on the recording film when the light has traversed the recording film is expressed by $$\exp(-4\pi \cdot k \cdot dr/\lambda)$$

where k denotes the absorption coefficient by the recording film of light transmitted only once through the film of the recording material. It is noted that, for realizing a high transmittance, the light is desirably transmitted only once through the inside of the film of the recording material which in general is a multi-path interference film. If the light absorption rate by the recording film is already not less than 60%, the transmittance cannot be made higher, such that a multi-layered optical disc cannot be realized. Thus, the upper limit of the thickness of the recording film is determined by the following relation:

$$\exp(-4\pi \cdot k \cdot dr/\lambda) \geq 40\%.$$

There is also a lower limit for the film of the recording material. If the film of the recording material is to be formed by sputtering, the thin film cannot be formed to a thickness of not more than 5 nm, such that the material is present in a known manner in an island pattern. Therefore, the thickness of the film of the recording material is desirably not less than 5 nm.

Thus, the thickness of the film of the recording material needs to meet the following relation:

$$\exp(-4\pi \cdot k1c \cdot dr/\lambda) \geq 40\%$$

$$\exp(-4\pi \cdot k1a \cdot dr/\lambda) \geq 40\%$$

$$dr \geq 5 \text{ nm}.$$

These conditions of the film thickness are all met in the illustrative film structures of the first recording layer shown in FIGS. 6 to 8 and in FIG. 11 as later explained.

FIG. 11 shows the structure of the first recording layer in case the recording and/or reproducing wavelength is 400 nm. With $Ge_2Sb_2Te_5$, a phase change recording material, extensively used in the first recording layer, the refractive index and the ratio of the absorption rate between the crystal and the amorphous phases becomes smaller for the wavelength of 400 nm, such that it is difficult to satisfy the condition, now to be explained, with the H-L type recording layer configuration. In actuality, no suitable layered structure has been found. The layered structure which satisfies the condition has been acquired in the L-H type recording layer configuration. FIG. 11 shows such an illustrative structure. In the structure of FIG. 11, the following conditions are met:

$$0.8 \leq Tc/Ta/=1.04 \leq 1.2$$

$$70\% \geq T1c = 53.5\% \geq 40\%$$

$$70\% \geq T1a = 51.1\% \geq 40\%$$

$$Ac/Aa = 1.10 \geq 1.0.$$

Therefore, in the recording and/or reproducing wavelength of 400 nm, the L-H information recording type is desirable for realization of a high performance overwrite multi-layered optical disc.

As may be seen from the illustrative layered structure, shown in FIG. 11, the reflectance prior to recording, that is in the crystalline state, is not higher than 3%. The outermost surface of the light incident side of a multi-layered optical disc is routinely formed of polycarbonate or a UV light curable resin, with the light reflectance on this surface being on the order of 5%. On the other hand, the light transmitting layer, here at issue, has a film thickness of approximately 100 μm, which is not larger than ⅙ of that of a conventional optical disc, such as DVD, and which is closer to the film thickness of the intermediate layer. When the incident light is to be focussed on the first recording layer or on the second recording layer, focussing error servo signals, obtained on making calculations based on the reflecting light from the respective recording layers, are detected to find the timing for focussing on the respective recording layers. However, if the light transmitting layer is too thin, it becomes difficult to separate the information from these respective recording layers from similar signals by the reflected light from the surface of the light transmitting layer. The result is that the focus tends to be formed at a reflected light from the recording layers or at a reflected light from the light transmitting layer, whichever has a higher reflectance. Therefore, the reflectance on the surface of the light transmitting layer is desirably lower than that of the recording layer. If the focus is to be formed on the first recording layer or on the second recording layer, the respective layers preferably are of reflectance values not less than 2% in order to apply the focussing servo. Therefore, the reflectance on the surface of the light transmitting layer is desirably not larger than 2%.

If the multi-layered optical disc of the L-H type is to be used, a light interference film is preferably used for prohibiting surface reflection. This will now be explained.

Figure 12:
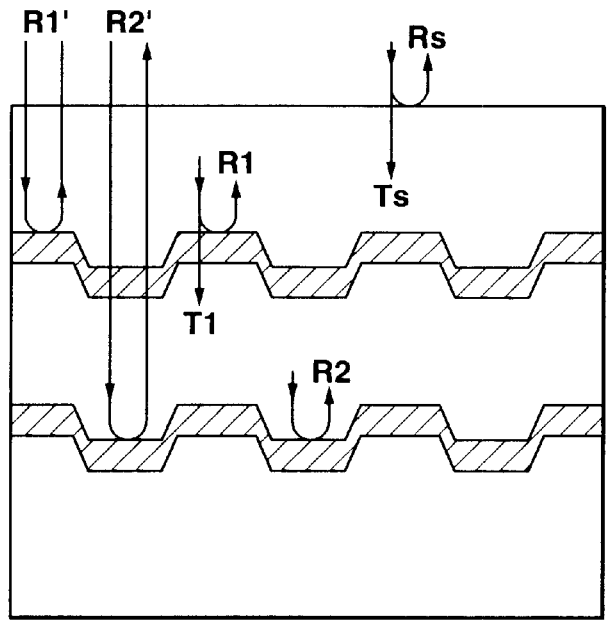
FIG. 12 is a schematic view for illustrating the definition of reflectance and transmittance of first and recording layers and a light transmission protective layer of a double-layer optical disc.

FIG. 12 shows the definitions of the reflectance and transmittance on respective recording layers of the incident light in the inside of the multi-layered optical disc. In FIG. 12, Rs and Ts denote the reflectance and transmittance on the surface of the light transmitting layer, respectively.

R1, T1 and R2 denote reflectance of light incident on the first recording layer, transmittance of light through the first recording layer and reflectance of light incident on the second recording layer, respectively. R2' denotes the ratio to the incident light volume of the volume of light incident on the light transmitting layer, transmitted through the first recording layer, reflected by the second recording layer, re-transmitted through the first recording layer and returned to the light transmitting layer.

Figure 13:
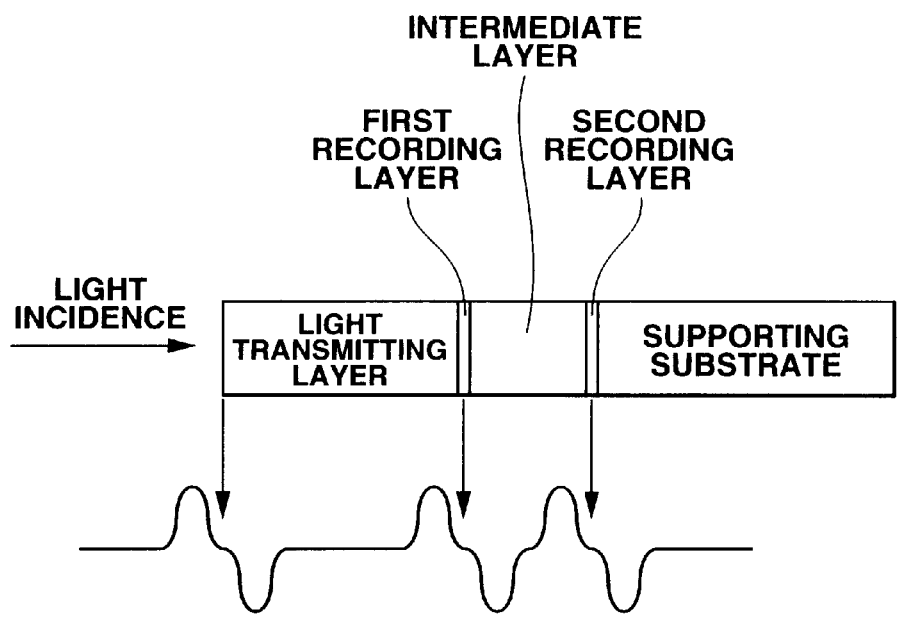
FIG. 13 is a schematic view showing focussing error signals during focussing servo in the absence of a light interference film on the surface of the light transmission protective layer.

Table 1 shows the reflectance values of the surface of the light transmitting layer, the first recording layer and the second recording layer in the presence and absence of the light interference film used for reducing the reflectance as later explained with reference to FIG. 14. FIG. 13 shows focussing error signals at the time of focussing search in the absence of the light interference film. Meanwhile, the focussing search means the operation of moving the objective lens up and down in FIG. 3 to cause the light focussing position to traverse the first and second recording layers.

TABLE 1

| | presence or absence of reflectance reducing light interference film on the light transmitting layer surface | |
|---|---|---|
| | not present | present |
| Rs | 4% | 0.2% |
| Ts | 96% | 99.8% |
| R1' | 4.6% | 5.0% |
| R2' | 5.0% | 5.4% |
| R1 | 5% | 5% |
| T1 | 52% | 52% |
| R2 | 20% | 20% |

At this time, the focussing position also traverses the surface of the light transmitting layer. For the present case, the astigmatic method is used as the focussing error search system. In FIG. 13, there appear three error signals accompanying the focussing search, which have occurred in the light transmitting layer 16, first recording layer 15 and on the second information layer 13. These signals are of the same level of amplitude, so that, if the signal of FIG. 13 is used to effect a focussing servo pull-in operation, the probability is high that the light be focussed by error on the surface of the light transmitting layer.

Figure 15:
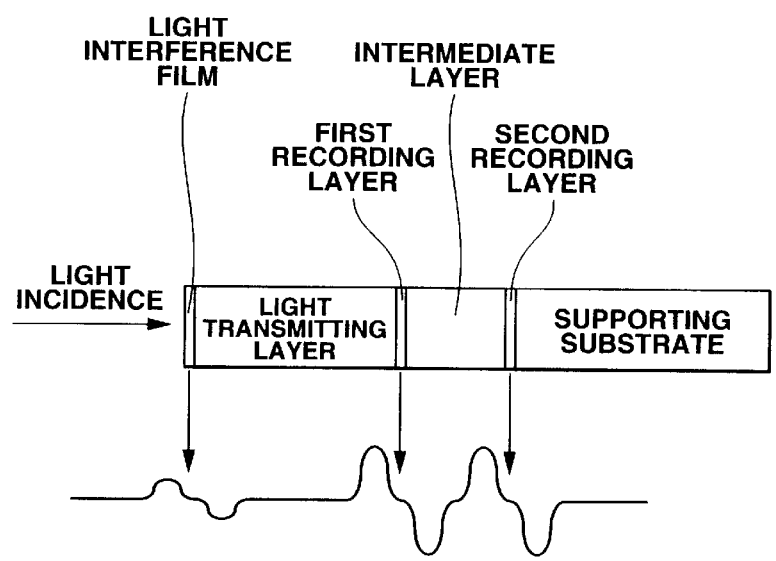
FIG. 15 is a schematic view showing focussing error signals during focussing servo in the presence of a light interference film on the surface of the light transmission protective layer.
Figure 16:
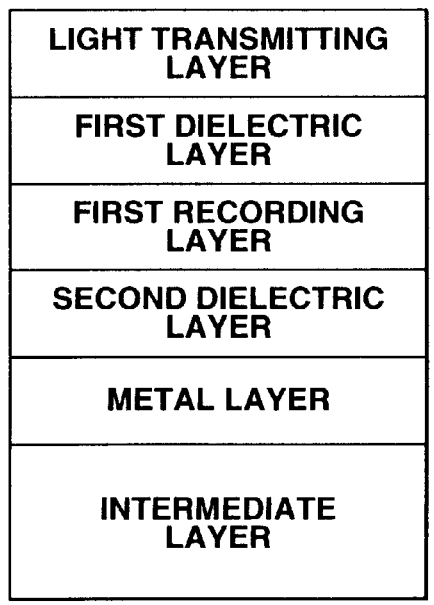
FIG. 16 is a schematic view showing an example of a layered structure having the capability as the first recording layer.
Figure 17:
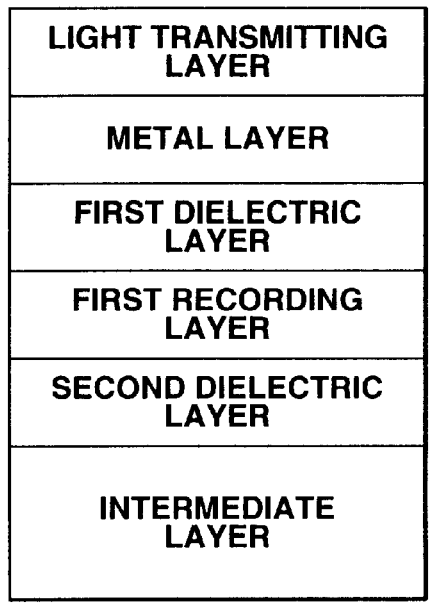
FIG. 17 is a schematic view showing another example of a layered structure having the capability as the first recording layer.
Figure 18:
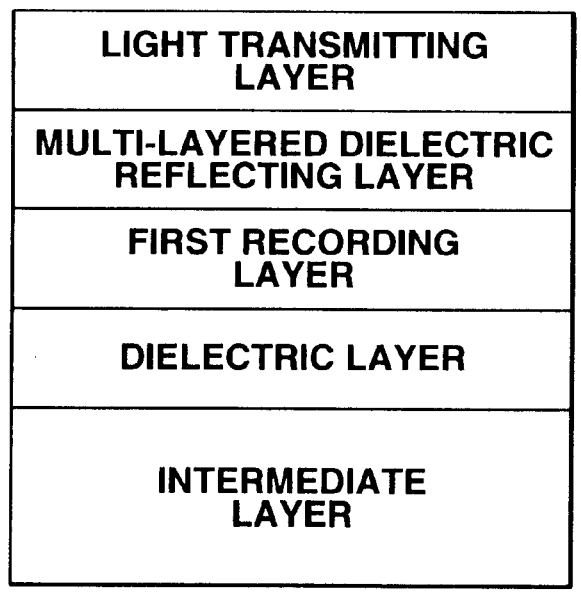
FIG. 18 is a schematic view showing still another example of a layered structure having the capability as the first recording layer.
Figure 19:
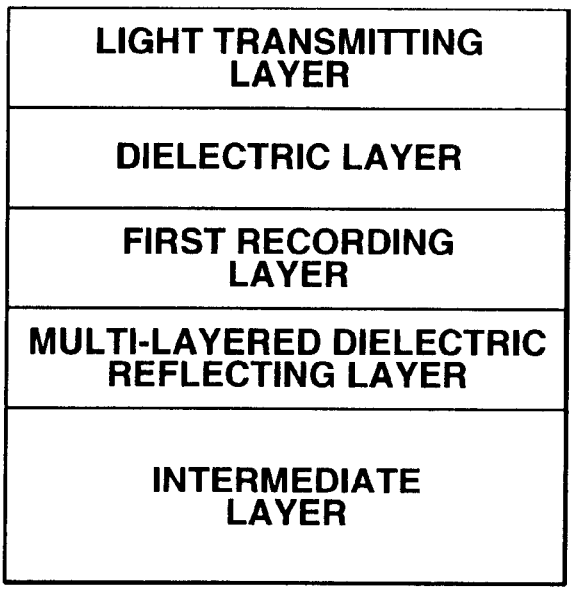
FIG. 19 is a schematic view showing a further example of a layered structure having the capability as the first recording layer.
Figure 20:
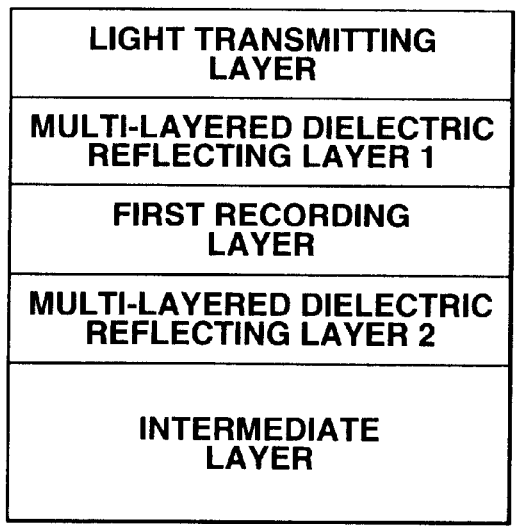
FIG. 20 is a schematic view showing yet another example of a layered structure having the capability as the first recording layer.
Figure 21:
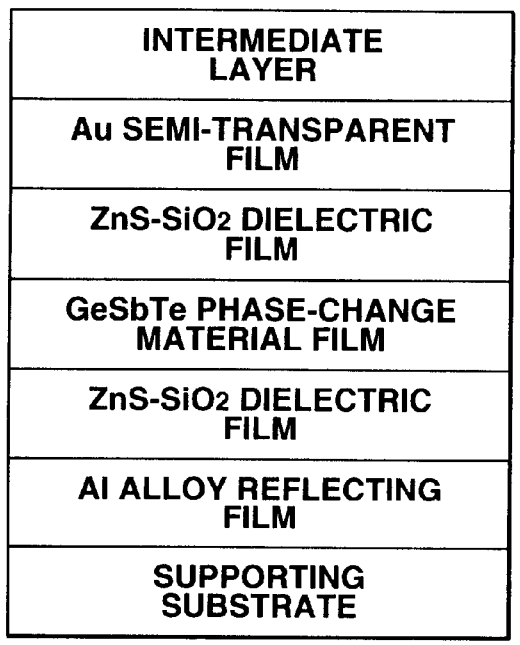
FIG. 21 is a schematic view showing an example of a layered structure having the capability as the second recording layer.
Figure 22:
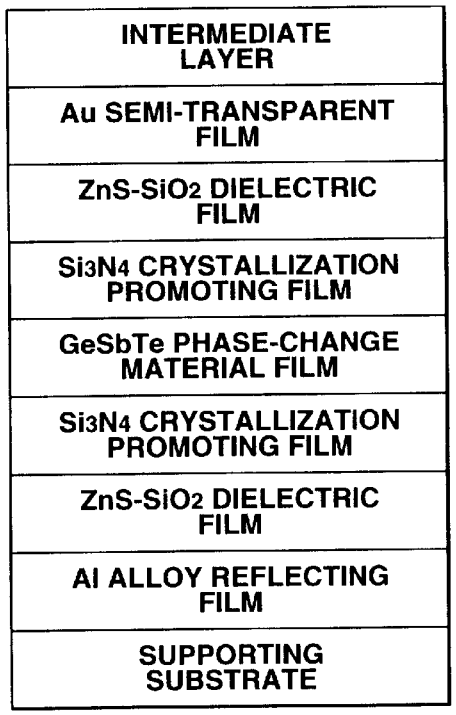
FIG. 22 is a schematic view showing another example of a layered structure having the capability as the second recording layer.
Figure 23:
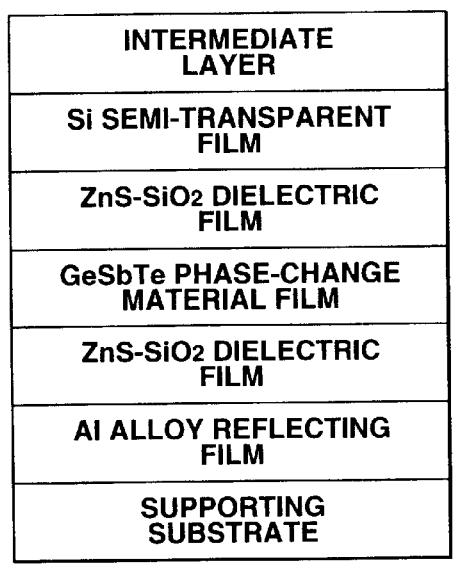
FIG. 23 is a schematic view showing still another example of a layered structure having the capability as the second recording layer.
Figure 24:
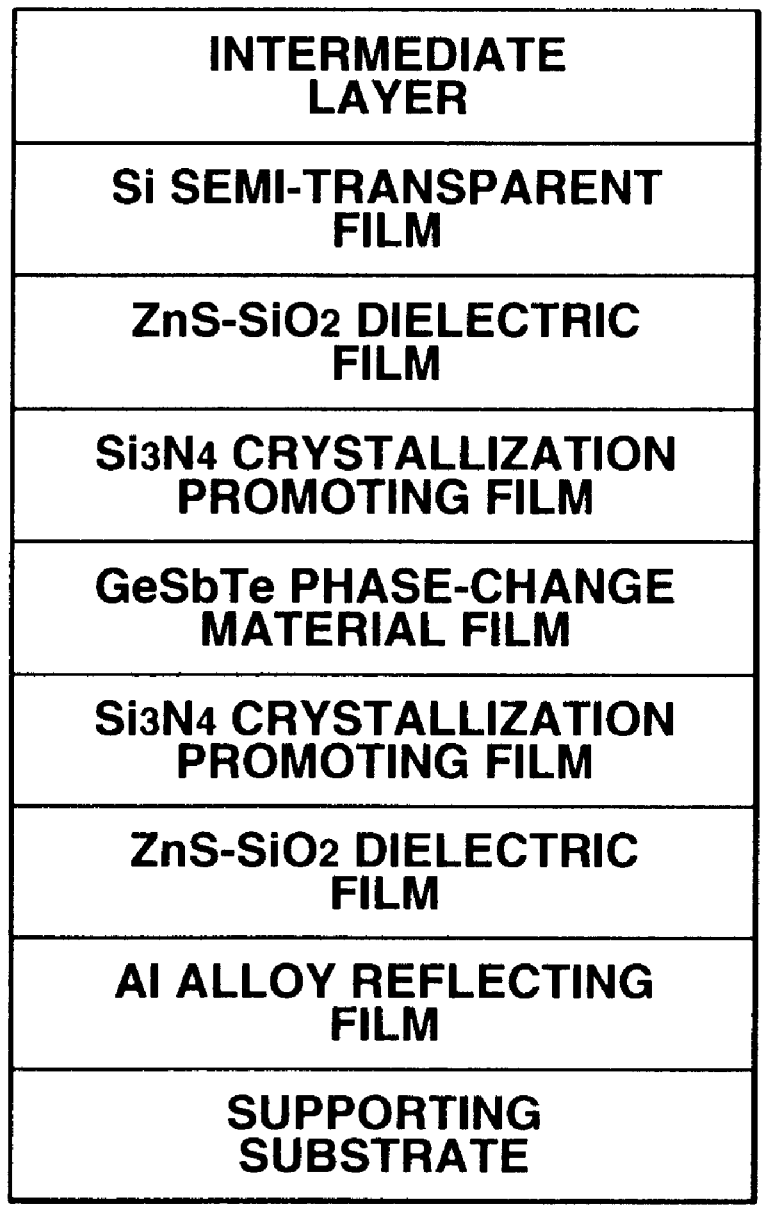
FIG. 24 is a schematic view showing yet another example of a layered structure having the capability as the first recording layer.

It is now assumed that a light interference film for reflectance reduction be formed on the surface of the light transmitting layer. FIG. 15 shows focussing error signals on focussing search in the presence of a light interference film. It is seen that, in FIG. 15, the amplitude of the focussing error signals by the surface of the light transmitting layer is smaller than in FIG. 13, such that clear distinction may be made from the recording layer.

Figure 14:
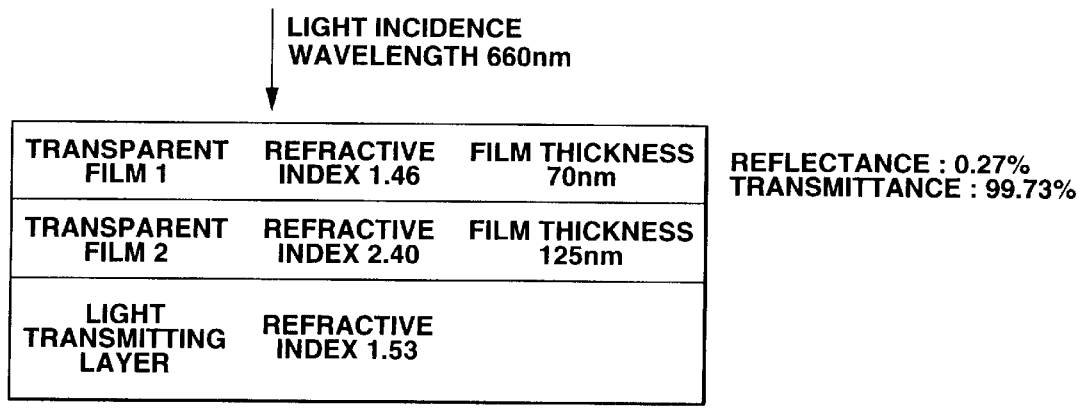
FIG. 14 is a schematic view showing an example of a film structure of a light interference film.

The volume of reflected light in the light interference film configuration shown in FIG. 14, with the film thickness of each transparent layer and with the refractive index as parameters, is now rendered into a mathematical equation. As the tangential components in the boundary surface of the thin film, the amplitude of the incident light is Ei, the amplitude of the reflected light is Er and the amplitude of the transmitted light is Et, and the relationship is to be expressed by the characteristic matrix used for calculating the reflectance of an optical thin film, the following equation (2) is obtained:

$$\begin{pmatrix} Ei+Er \\ (Ei+Er)y0 \end{pmatrix} = \begin{pmatrix} \cos(\delta 1) & i\sin(\delta 1)/y1 \\ iy1\sin(\delta 1) & \cos(\delta 1) \end{pmatrix} \begin{pmatrix} \cos(\delta 2) & i\sin(\delta 2)/y2 \\ iy2\sin(\delta 2) & \cos(\delta 2) \end{pmatrix} \begin{pmatrix} Et \\ Et \times ys \end{pmatrix} \quad (2)$$

$$\delta j = 2\pi \times nj \times hj/\lambda \; j=1,2$$

$$yj = \sqrt{(\in 0/\mu 0)} \times nj \; j=1,2$$

*$\sqrt{(\in 0/\mu 0)}$ is admittance in vacuum.
The energy reflection ratio is represented by $$|Er/Ei|^2 \quad (3)$$

and hence can be calculated from the relationship employing the above-mentioned characteristic matrix.

Since the surface reflectance of the light transmitting layer by itself is of the order of 4%, the disc surface reflectance is desirably not larger than 2% in order to distinguish the disc surface reflectance from the reflectance R1' of the fist recording layer, second recording layer R2' (=5%) and the volume of the reflected light. Therefore, the equations (2) and (3) desirably exhibit the following relation (4):

$$|Er/Ei|^2 \leq 2\% \quad (4)$$

There are numerous combinations of n1, n2, d1, d2 which satisfy the equation (3) and which operate as reflectance reducing interference films. Only a few examples are shown in Table 2.

TABLE 2

| n1 | n2 | d1 (mm) | d2 (mm) | Rs (%) |
|---|---|---|---|---|
| 1.4 | 2.0 | 180 | 190 | 1.76 |
| 1.5 | 2.2 | 80 | 120 | 0.04 |
| 1.6 | 2.0 | 80 | 100 | 0.70 |
| 1.7 | 2.0 | 130 | 50 | 1.16 |
| 1.8 | 2.0 | 100 | 70 | 1.25 |
| 1.9 | 2.2 | 80 | 80 | 0.54 |
| 2.0 | 2.2 | 80 | 80 | 1.42 |

For reducing the reflectance on the surface of the light transmitting layer as far as possible, it is desirable that the relation be met:

$$n1 \times d1 = n2 \times d2 = \lambda/4, \text{ where } \lambda \text{ is the wavelength of the incident light in vacuum} \quad (5)$$

with $$(n2/n1)^2 = ns \quad (6)$$

and with $$n1 < n2 > ns \quad (7)$$

At this time, the reflectance is theoretically 0%. Although slight deviation is produced by the error caused in the manufacture of thin films, it is possible to reduce reflectance to approximately 0.2%.

FIGS. 16 to 20 show different types of a layered structure having the capability as the first recording layer.

FIGS. 21 to 24 show different types of a layered structure having the capability as the second recording layer.

Specified experimental results for the recording and/or reproducing wavelength of 400 nm of the first recording layer are shown in Tables 3 to 7. The optical characteristics of the materials used in these examples are shown in Table 8.

TABLE 3

| type | ZSS1 | GST | ZSS2 | Rc | Ra | Tc | Ta | Ac | Aa | Tavg | A/Aa |
|---|---|---|---|---|---|---|---|---|---|---|---|
| H-L | 130 | 8 | 150 | 11.6 | 3.1 | 48.9 | 54.8 | 39.5 | 42.0 | 51.9 | 0.94 |
| L-H | 110 | 8 | 100 | 2.9 | 9.1 | 53.3 | 51.1 | 43.7 | 39.8 | 52.2 | 1.10 |

TABLE 4

| type | ZSS1 | GST | SiO2 | ZSS2 | Rc | Ra | Tc | Ta | Ac | Aa | Tavg | Ac/Aa |
|---|---|---|---|---|---|---|---|---|---|---|---|---|
| H-L | 120 | 8 | 150 | 110 | 4.0 | 1.3 | 59.3 | 62.6 | 36.3 | 36.1 | 61.2 | 1.01 |
|  | 130 | 8 | 140 | 110 | 4.6 | 1.8 | 60.9 | 63.8 | 34.5 | 34.4 | 62.4 | 1.00 |
| L-H | 110 | 8 | 110 | 50 | 7.1 | 15.9 | 54.8 | 50.7 | 38.0 | 33.4 | 52.8 | 1.14 |
|  | 120 | 8 | 110 | 130 | 54.0 | 51.2 | 54.0 | 51.2 | 44.5 | 40.7 | 52.6 | 1.11 |

TABLE 5

| type | ZSS1 | SiO2 | GST | ZSS2 | Rc | Ra | Tc | Ta | Ac | Aa | Tavg | Ac/Aa |
|---|---|---|---|---|---|---|---|---|---|---|---|---|
| H-L | 50 | 120 | 8 | 50 | 5.1 | 2.3 | 61.0 | 63.9 | 33.9 | 33.7 | 62.5 | 1.01 |
| L-H | 130 | 120 | 8 | 180 | 1.1 | 8.1 | 51.3 | 48.9 | 47.6 | 43.0 | 50.1 | 1.15 |
|  | 50 | 110 | 8 | 190 | 8.4 | 17.8 | 52.5 | 48.0 | 39.1 | 34.0 | 50.3 |  |

TABLE 6

| type | Si | ZSS1 | GST | ZSS2 | Rc | Ra | Tc | Ta | Ac | Aa | Tavg | Ac/Aa |
|---|---|---|---|---|---|---|---|---|---|---|---|---|
| H-L | 2 | 120 | 8 | 110 | 2.8 | 0.2 | 53.6 | 56.3 | 33.6 | 33.5 | 55.0 | 1.00 |
| L-H | 2 | 100 | 8 | 110 | 3.9 | 11.5 | 51.3 | 49.2 | 38.3 | 34.9 | 50.3 | 1.10 |
|  | 4 | 100 | 8 | 110 | 3.2 | 8.8 | 51.8 | 51.3 | 32.2 | 30.6 | 51.6 | 1.05 |

TABLE 7

| type | Au | ZSSI | GST | ZSS2 | Rc | Ra | Tc | Ta | Ac | Aa | Tavg | Ac/Aa |
|---|---|---|---|---|---|---|---|---|---|---|---|---|
| H-L | 2 | 50 | 8 | 120 | 5.7 | 2.2 | 51.1 | 53.0 | 25.3 | 24.9 | 52.1 | 1.02 |
|  | 2 | 140 | 8 | 200 | 7.2 | 3.0 | 49.7 | 51.2 | 28.0 | 27.5 | 50.5 | 1.02 |
| L-H | 2 | 120 | 8 | 120 | 1.4 | 3.7 | 51.1 | 51.5 | 25.3 | 24.2 | 51.3 | 1.05 |

TABLE 8

| | n-𝒦(complex refractive index, recording and/or reproducing wavelength λ = 400 nm) | optical conditions required |
|---|---|---|
| ZSS (ZnS—SiO2) | 2.32 | Rc/Ra ≧ 2.0<br>Tavg ≧ 50<br>Ac/Aa ≧ 1.0 |
| GST-C (GeSbTe)(crystal)) | 2.0–3.0i | |
| GST-A (GeSbTe (amorphous)) | 3.0–2.0i | |
| Si | 4.96–0.48i | |
| SiO2 | 1.5 | |
| Au | 2.0–2.5i | |
| light transmission protective layer | 1.57 | |
| substrate | 1.57 | |

In any case, the value of Ac/Aa is larger with the H-L type than with the L-H type.

An optical disc comprised of plural sets each made up of an enhancement film, a crystallization promoting film and an information recording film by a phase change material are layered together, and also comprised of a reflecting film on only the information recording layer closest to a supporting substrate is hereinafter explained. The film materials constituting the respective recording layers are selected so that the optical disc is overwritable and is able to make high density recording.

Figure 25:
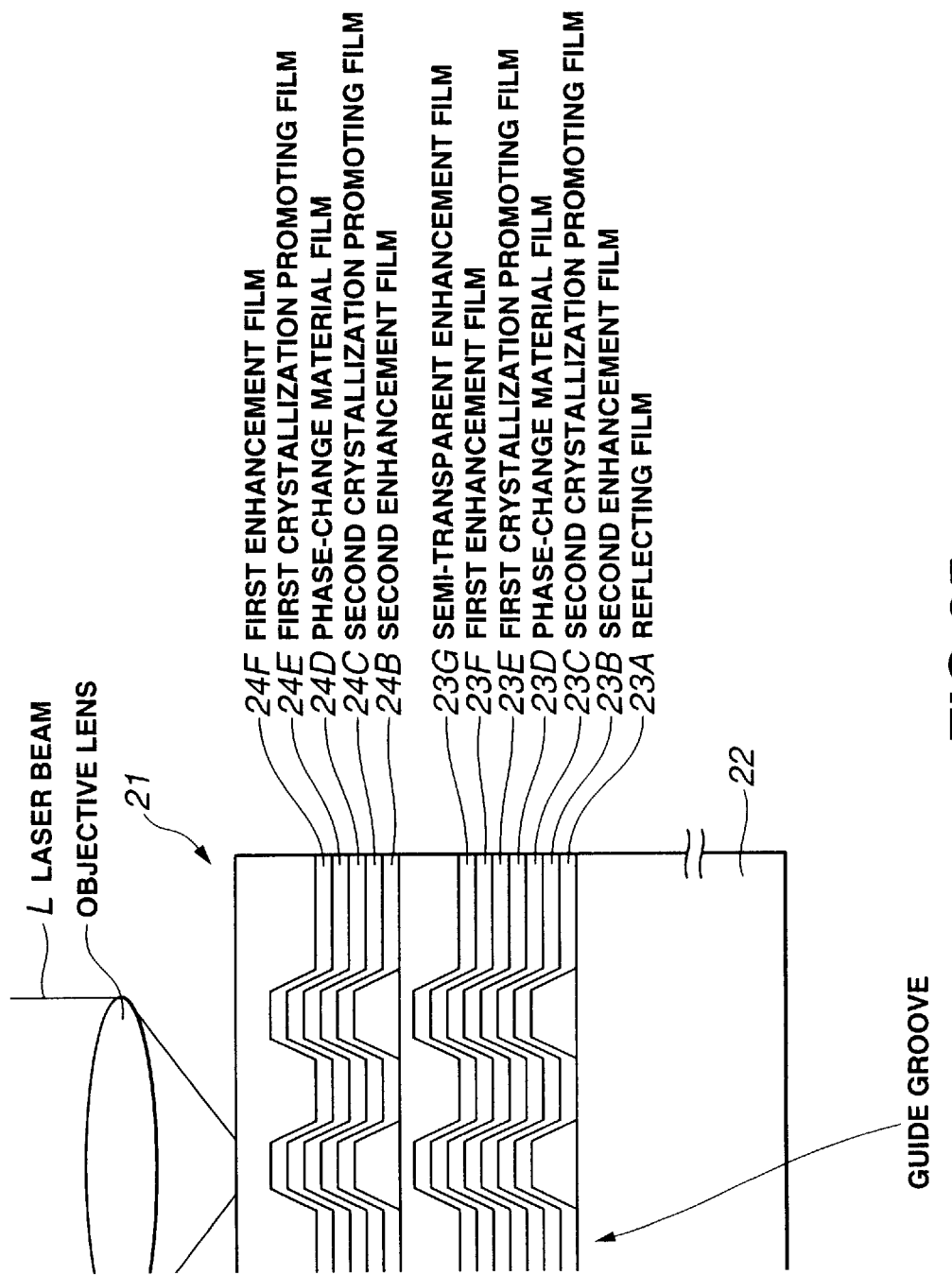
FIG. 25 is a cross-sectional view showing another example of an optical disc embodying the present invention.

FIG. 25 shows a cross-section showing such optical disc. This optical disc 21 is applied to a case of high density recording the desired information at a high transfer rate and reproducing the recorded information. In forming the optical disc 21, plural information recording layers 23, 24 are layered on the supporting substrate 22, with the interposition of the intermediate layers 26, and a light transmitting layer 26 is formed thereon. With the optical disc 21, a pre-set amount of the laser light beam is selectively converged on the information recording layers 23, 24, from the side of the light transmitting layer 26, to record desired data on the respective information recording layers 23, 24.

In the information recording layer 23 of the supporting substrate 22 is formed a pattern of crests and recesses, constituting a guide groove of the laser light beam L, and is designed as a plastics substrate, a glass substrate, or a metal substrate of, for example, aluminum or stainless steel. If the supporting substrate 22 is formed of plastics, the pattern of crests and recesses is formed by injection molding, whereas, if the supporting substrate 22 is formed of glass or metal, the pattern is formed by the photopolymer (2P) method. The supporting substrate is formed to a thickness of 0.3 mm to 1.2 mm, so that the thickness of the optical disc 21 in its entirety is not thicker than the currently commercialized optical disc.

The information recording layer 23 is provided with a film of a phase change material and is formed to high sensitivity to enable the recording reliably even with the light transmitted through the information recording layer 24. Specifically, the information recording layer 23 is formed by sequentially layering, from the side of the supporting substrate 22, a reflecting film 23A, a second enhancement film 23B, a second crystallization promoting layer 23C, a film of a phase change material 23D, a first crystallization promoting layer 23E, a first enhancement film 23F and a semi-transparent enhancement film 23G.

It is noted that the reflecting film 23A is constituted by an Al alloy, a BiSb alloy or an Ag alloy, and is configured to reflect the laser light beam L transmitted through the film of the phase change material 23D to cause it to be re-incident on the film of the phase change material 23D to increase the utilization efficiency of the laser light beam L to improve the sensitivity of the information recording layer 23. This enables the film of the phase change material 23D to be reliably fused by the light beam transmitted through the upper layer side information recording layer 24 and which is thus reduced in light volume, even if the beam spot diameter is small-sized to increase the linear speed.

The second enhancement film 23B and the first enhancement film 23F are formed of at least one of ZnS, ZnS—SiO$_2$, SiO$_2$ and MgF$_2$. By selecting the film thicknesses of these films 23B, 23F depending on the optical properties of the respective materials, the reflectance difference between a crystallized area and the amorphous area of the film of the phase change material 23D is increased, whereby it is possible for the second enhancement film 23B and the first enhancement film 23F to discriminate the crystallized area and the amorphous area of the film of the phase change material 23D even in cases wherein the beam spot diameter is reduced to increase the linear speed. The second enhancement film 23B and the first enhancement film 23F may be omitted if the reflectance difference between the crystallized area and the amorphous area in the film of the phase change material 23D can be maintained to a practically sufficient extent by the phase change material making up the phase change material 23D and the configuration of the optical system.

The second crystallization promoting film 23C and the first crystallization promoting film 23E are manufactured by a material having only inferior wetting properties with respect to the film of the phase change material 23D so that, if the phase change material is solidified to an amorphous state, it is solidified to a high energy state to promote the melting and crystallization of the film of the phase change material 23D as a relaxation phenomenon. Specifically, the second crystallization promoting film 23C is formed of a material containing at least one of Si, SiC, Ge, GeC, Sn, SnC, Al, AlC, Ga, GaC, In, InC chlorides or oxides thereof, to a film thickness proper to optical properties of the respective materials. In this manner, the second crystallization promoting film 23C and the first crystallization promoting film 23E are able to crystalize the amorphous area of the film of the phase change material 23D easily even if the beam spot diameter is reduced to increase the linear speed. Meanwhile, the second crystallization promoting film 23C and the first crystallization promoting film 23E can occasionally be omitted if the linear speed of the laser light beam L is low, since then the sufficient time for crystallization is assured.

The film of the phase change material 23D is formed of a phase change material selected from the group of InSe, SbSe and SbTe binary alloys, InSbSe, GeSbTe and InSbTe ternary alloys, GeSbTeSe and AgInSbTe quatanary alloys, an AgInSbSeTe quinary alloys, nitrides and oxides of these alloys. The film of the phase change material 23D is prepared by e.g., sputtering. If the film of the phase change material 23D is prepared by sputtering, the film of the phase change material 23D in its entirety is usually crystallized on illumination of an even light beam, directly after preparation, by way of executing the so-called initialization.

The semi-transparent enhancement film 23G causes multi-path reflection of the light beam transmitting through the film of the phase change material 23D to increase the sensitivity if the information recording layer 23. The semi-transparent enhancement film 23G also reverses the reflectance rate between the crystallized area and the amorphous area of the film of the phase change material 23D when looking from the side the light transmitting layer B. That is, the reflectance and the thermal conductivity are generally higher in the crystallized region than in the amorphous region. Moreover, in the crystallized region, latent heat is required for melting, so that the crystallized region is more difficult to melt than the amorphous region. Thus, in the case of direct overwrite, non-erasure occurs partially. This partial non-erasure is observed by waveform distortion of the playback signals on reproduction. Thus, the semi-transparent enhancement film 23G reverses the reflectance ratio between the crystallized region and the amorphous region to permit a larger amount of the light beam to be illuminated on the crystallized region to prohibit partial non-erasure due to overwriting. The semi-transparent enhancement film 23G is prepared by a material containing at least one of Au, an AuCo alloy, Si, an Ag alloy, $SiO_x$, $ZnS$—$SiO_x$, an Au—$SiO_2$ mixture and an Au—ZnS—$SiO_2$ mixture, where $x \leq 2$.

The intermediate layer 5 is a layer of a transparent material of a thickness of approximately 30 $\mu$m, and is formed by an acrylic acid based UV light curable resin, a polycarbonate sheet or a polyolefin sheet. This intermediate layer 25 is set so that, if the light beam L is converged on one of the information recording layer 23 or 24, the light beam L will be practically sufficiently defocussed on the other information recording layer 24 or 23, in such a manner that temperature rise in the other information recording layer 24 or 23 is not above a predetermined value. To this end, the intermediate layer 25 has its thickness limited by the numerical aperture NA of the objective lens L converging the laser light beam L. It is noted that, if the numerical aperture NA of the objective lens L is increased, the beam spot diameter is reduced, so that, if, by this reduction in the beam spot diameter, such a recording capacity is to be maintained which renders recording difficult for a conventional two-layered optical disc and which is of the order of 15 GB for a 12-inch optical disc, the numerical aperture NA of the order of 0.9 to 0.8 is required. Thus, the intermediate layer 25 is set to a film thickness of the order of 30 $\mu$m so that the film thickness will be sufficient to realize this order of magnitude of the numerical aperture NA.

Similarly to the supporting substrate 22, the intermediate layer 25 carries a pattern of crests and recesses on the side of the information recording layer 24. This pattern of crests and recesses constitutes a guide groove for the laser light beam L.

Similarly to the information recording layer 23, the information recording layer 24 is provided with a film of a phase change material, and is designed to have sensitivity lower than that of the information recording layer 23. That is, the information recording layer 4 is formed similarly to the information recording layer 23 provided on the side of the supporting substrate except that the reflecting layer and the semi-transparent enhancement layer are both omitted. Thus, the information recording layer 24 is formed by sequentially layering, from the side of the supporting substrate 22, a second enhancement film 24B, a second crystallization promoting film 24C, a film of a phase change material 24D, a first crystallization promoting film 24E, and a first enhancement film 24F. The second enhancement film 24B, a second crystallization promoting film 24C, a film of a phase change material 24D, a first crystallization promoting film 24E, and a first enhancement film 24F are configured similarly to the corresponding films of the first information recording layer 23. Thus, it is possible with the information recording layer 24 to reliably record the desired information and to reproduce the recorded information even if the beam spot size is reduced to increase the linear speed, as in the case of the information recording layer 24.

The light transmitting layer 26, constituting a protective layer for the information recording layer 24, is formed by using an acrylic acid based UV light curable resin, a polycarbonate sheet or a polyolefin sheet. The light transmitting layer 26 is formed to a thickness of 10 to 177 $\mu$m so that skew distortion can be diminished sufficiently on radiating the laser light beam L via an objective lens having the numerical aperture NA of the order of 0.8 to 0.9.

Meanwhile, the information recording layers 23, 24 are preferably of the multi-layered structure, shown in FIG. 1, in light of reliable recording and/or reproduction of desired information signals in case of reducing the beam spot diameter to increase the linear speed. However, if the linear speed of the laser light beam L is low, the crystallization promoting layers 23C, 23E, 24C, 24E or the enhancement films 23B, 23F, 24B, 24F can be optionally omitted, as described above. If the structure of the information recording layers 23, 24 is simplified in this manner, the desired information can be reliably recorded and/or reproduced preferably by sequentially layering a reflecting film, an enhancement film, a film of a phase change material, a crystallization promoting film, an enhancement film and a semi-transparent enhancement film or, more preferably, by layering a reflecting film, an enhancement film, a crystallization promoting film, a film of a phase change material, a crystallization promoting film, an enhancement film and a semi-transparent enhancement film, looking from the side of the supporting substrate 22, even if the beam spot diameter is diminished to increase the linear speed.

Although the foregoing embodiment is directed to preparation of the optical disc by layering two information recording layers, the present invention is not limited to this configuration and may be applied to constructing an optical disc by layering plural information recording layers. Moreover, the present invention may be broadly applied to a variety of optical information recording layers, in addition to an optical disc.

Figure 26:
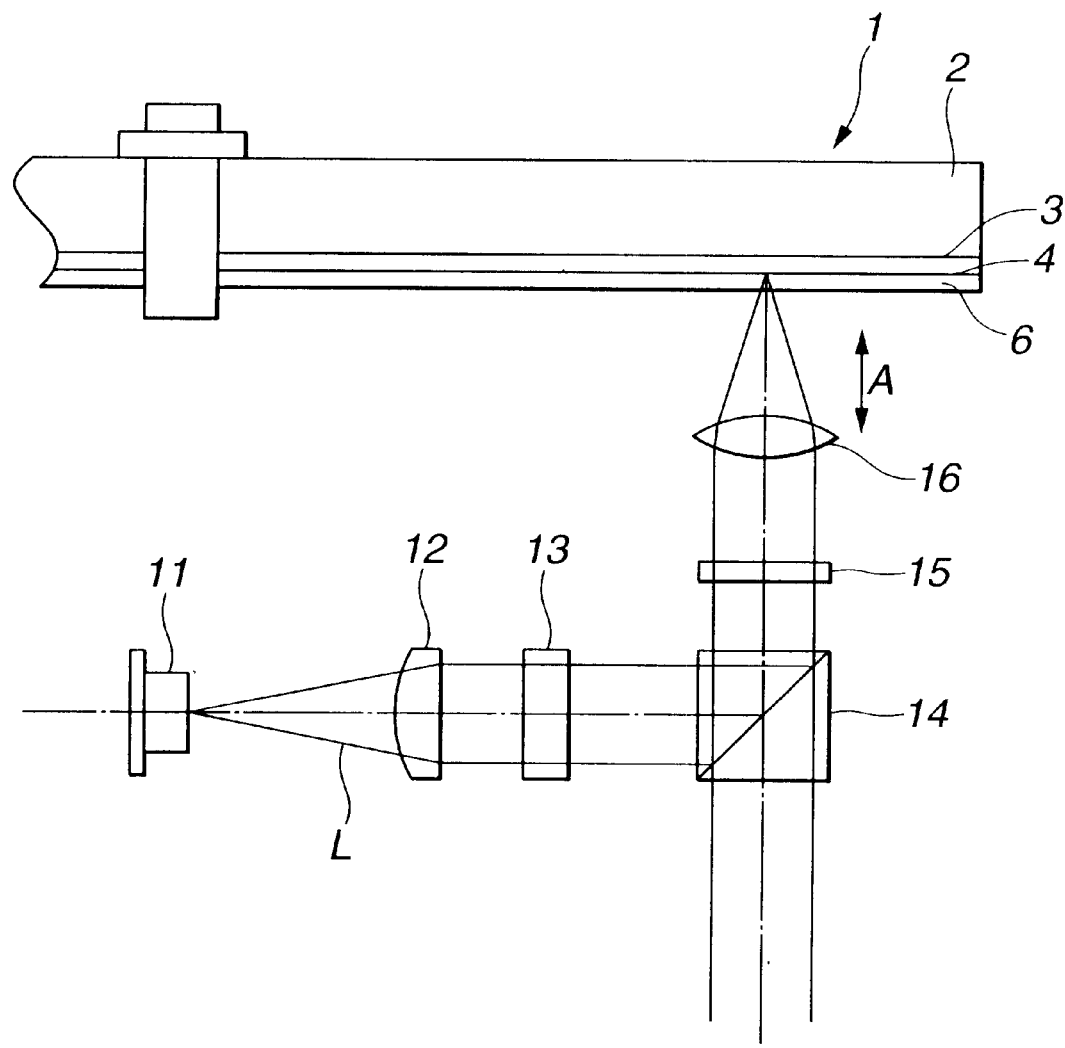
FIG. 26 is a schematic view showing an optical system of an optical disc device for accessing an optical disc of FIG. 25.

FIG. 26 is a diagrammatic view showing an optical system of an optical disc device for accessing the optical disc 21. This optical disc device 30 converts the laser light beam L, radiated from the laser diode 31, into a collimated light beam by a collimator lens 32 and corrected for astigmatic aberration by an astigmatism correcting plate 33. The resulting light beam is reflected by a polarizing beam splitter 34 to warp the optical path of the laser light beam in a direction towards the optical disc 21. The optical disc 30 also polarizes the light beam by a quarter wave plate 35 to illuminate the polarized light on an optical disc 21 by an objective lens 36. The optical disc device 30 causes movement of the optical disc 36 in a direction along the optical axis to selectively converge the laser light beam L on the information recording layer 23 or 24 to selectively access the information recording layer 23 or 24.

The optical disc device 30 also receives the return light, obtained on radiating the light beam, by the objective lens 36, and then polarizes the return light by the quarter wave plate 35, arranged next to the objective lens 36, to the plane of polarization lying at right angles to the laser light beam L. The optical disc device 30 also permits the return light from the quarter wave plate 35 to be transmitted through the polarizing beam splitter 34 to converge the transmitted light beam by a collimator lens 37 on the light receiving surface of a light receiving element 38.

For reproduction, the optical disc device 30 causes the laser light beam L to be radiated from the laser diode 31, with a constant playback light volume, to process the result of the received light by the light receiving element 38 to reproduce the information recorded on the optical disc 21. For recording, the light volume of the light beam is intermittently increased from the pre-set light volume to partially amorphize or partially crystallize the film of the phase change material of the information recording layer 23 or 24 to record the desired information by a pit string.

In the structure of the above-described embodiment, the film of the phase change material is held by the crystallization promoting film, the enhancement film, a reflection film and a semi-transparent enhancement film are arranged on the side of the supporting substrate and on the opposite side, respectively, and the materials of these films are selected properly to enable the desired data to be positively recorded and/or reproduced, despite reduction in the size of the beam spot diameter and increased linear speed, whereby it is possible to realize an information recording medium which is overwritable and on which the information can be recorded to high density.

That is, by forming the crystallization promoting film of a material containing at least one of Si, SiC, Ge, GeC, Sn, SnC, Al, AlC, Ga, GaC, In, InC, chlorides and oxides thereof, it is possible to amorphize the phase change material easily.

In addition, by forming the enhancement film by a material containing at least one of ZnS, ZnS—$SiO_2$, $SiO_2$ and $MgF_2$, it is possible to reliably distinguish the amorphous and crystallized portions from each other.

By forming the semi-transparent enhancement film by a material containing at least one of $SiO_x$, a ZnS—$SiO_2$, Au—$SiO_2$ mixture and an Au—ZnS—$SiO_2$ mixture, it is possible to positively prohibit insufficience erasure.

Also, by forming the reflective film by a material containing one of Al alloys and BiSb, it is possible to achieve sufficient sensitivity.

EXAMPLES

In the following, specified Examples of the multi-layered optical disc according to the present invention are explained.

Example 1

Figure 27:
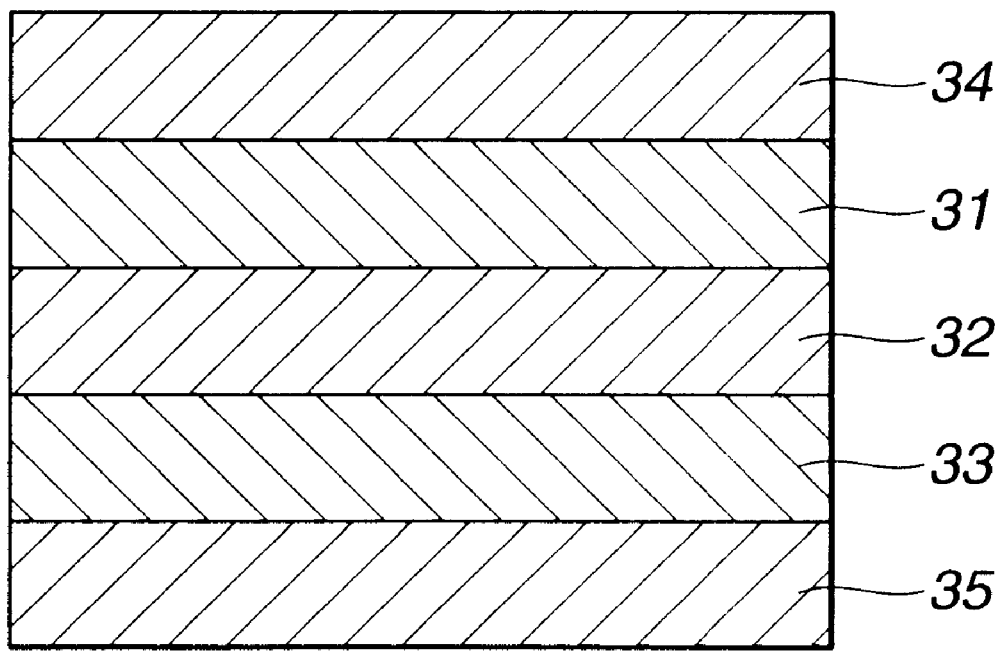
FIG. 27 is a schematic cross-sectional view showing an example of a film structure of the first information recording layer embodying the present invention.
Figure 28:
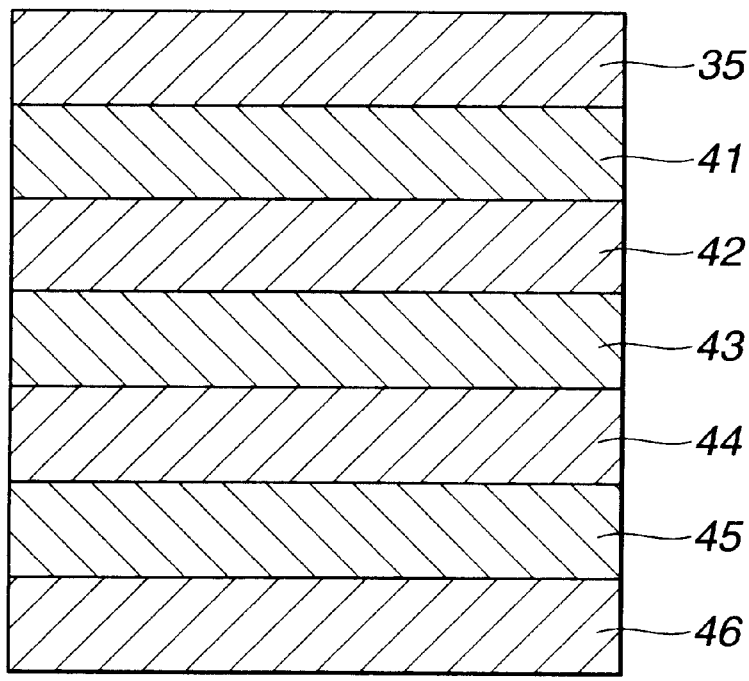
FIG. 28 is a schematic cross-sectional view showing an example of a film structure of the second information recording layer.

The first information recording layer on the light incident side is of a three-layered structure comprised of a ZnS—$SiO_2$ mixed dielectric film 31, a film of a GeSbTe phase change material 32, and a ZnS—$SiO_2$ mixed dielectric film 33, looking from the light incident side, as shown in FIG. 27. On the ZnS—$SiO_2$ mixed dielectric film 31, there is formed a light transmission protective film 34, whereas, on the opposite side of the layered structure, there is formed a second information recording layer, as later explained, with interposition of an intermediate layer 35.

The optical constants for the wavelength of 400 nm are such that the refractive index of ZnS—$SiO_2$ of 2.32, the complex refractive index of the GeSbTe crystal of 2.0–3.0i and the complex refractive index of the amorphous phase of 3.0–2.0i. As a result of calculations of the film thickness structure, employing these values, there was found a solution which met the condition shown in FIG. 2 at a film thickness of the ZnS—$SiO_2$ mixed dielectric film of 110 nm, a film thickness of the GeSbTe phase change material of 8 nm and a film thickness of the ZnS—$SiO_2$ mixed dielectric film of 100 nm, looking from the light incident side. The reflectance of the crystal, reflectance of the amorphous phase, absorption rate of the crystal, absorption rate of the amorphous phase, transmittance of the crystal and the transmittance of the amorphous phase were 2.9%, 9.1%, 43.7%, 39.8%, 53.4%, and 51.1%, respectively.

The layered structure of the second information recording layer was a five-layered structure, comprised of a Si semi-transparent film 41, a ZnS—$SiO_2$ mixed dielectric film 42, a layer of a GeSbTe phase change material 43, a ZnS—$SiO_2$ mixed dielectric film 44, and an Al alloy reflective film 45, looking sequentially from the light incident side, as shown in FIG. 5. These layers are formed on a supporting substrate 46, and the above-mentioned first information recording layer is layered thereon via the intermediate layer 35.

The optical constants for the wavelength of 400 nm are such that the complex refractive index of Si is 4.96–0.48i, the refractive index of ZnS—$SiO_2$ is 2.32, the complex refractive index of the GeSbTe crystal is 2.0–3.0i, the complex refractive index of the amorphous phase is 3.0–2.0i and the complex refractive index of the Al alloy is 0.59–4.43i.

As a result of calculations of the film thickness structure, employing these values, there was found a solution which met the condition shown in FIG. 2 at a film thickness of the Si semi-transparent film 41 of 8 nm, a film thickness of the ZnS—$SiO_2$ mixed dielectric film of 80 nm, a film thickness of the film of the GeSbTe phase change material of 14 nm, a film thickness of the ZnS—$SiO_2$ mixed dielectric film of 30 nm and a film thickness of the Al alloy reflective film of 19 nm. Specifically, the reflectance of the crystal phase, reflectance of the amorphous phase, the absorption rate of the crystal phase and the absorption rate of the amorphous phase were 6.8%, 28.0%, 69.0% and 56.9%, respectively.

A recording medium of the aforementioned film structure was formed by sputtering to enable recording and/or reproduction with the wavelength of 400 nm, a numerical aperture NA of the objective lens of 0.85, a linear speed of 4 m/sec and a pit length of 0.135 μm.

Example 2

Figure 29:
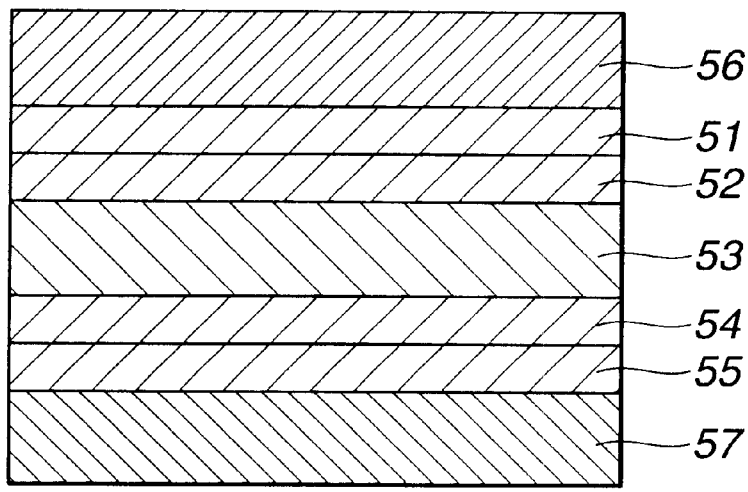
FIG. 29 is a schematic cross-sectional view showing another example of a film structure of the first information recording layer embodying the present invention.

The first information recording layer on the light incident side was of a five-layered structure comprised of a ZnS—$SiO_2$ mixed dielectric film 51, a $Si_3N_4$ dielectric film 52, a film of a GeSbTe phase change material 53, a $Si_3N_4$ dielectric film 54 and a ZnS—$SiO_2$ mixed dielectric film 55, looking from the light incident side, as shown in FIG. 29. On the ZnS—$SiO_2$ mixed dielectric film 51 was formed a light transmission protective layer 56. On the opposite side of the layered structure was formed a second information recording layer, as later explained, with an intermediate layer 57 in-between.

The optical constants for the wavelength of 400 nm are such that the refractive index of ZnS—SiO$_2$ is 2.32, the refractive index of Si$_3$N$_4$ is 2.32, the complex refractive index of GeSbTe was 2.0–3.0i and the complex refractive index of the amorphous phase 55 was 3.0–2.0i. As a result of calculations of the film thickness structure, employing these values, there was found a solution which met the condition shown in FIG. 2 at a film thickness of the ZnS—SiO$_2$ mixed dielectric film of 100 nm, a film thickness of the film of the Si$_3$N$_4$ dielectric film of 10 nm, a film thickness of the film of the phase change material of 8 nm, a film thickness of the film of the Si$_3$N$_4$ dielectric film of 10 nm and a ZnS—SiO$_2$ mixed dielectric film of 90 nm, looking from the light incident side. Specifically, the reflectance of the crystal phase, reflectance of the amorphous phase, absorption rate of the crystal phase, absorption rate of the amorphous phase were, transmittance of the crystal phase and the transmittance of the amorphous phase were 2.9%, 9.1%, 43.7%, 39.8%, 53.4% and 51.1%, respectively.

Figure 30:
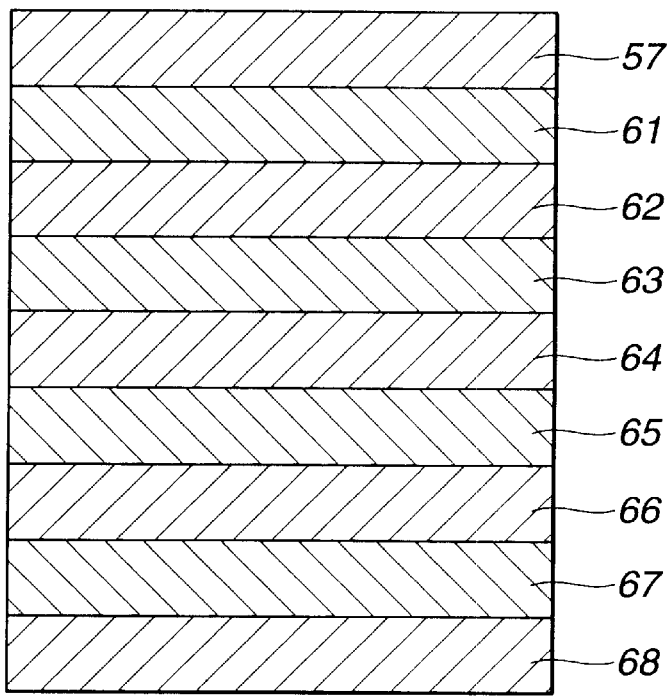
FIG. 30 is a schematic cross-sectional view showing another example of a film structure of the second information recording layer.

The second information recording layer was of a seven-layered structure comprised of a Si semi-transparent film 61, a ZnS—SiO$_2$ mixed dielectric film 62, a Si$_3$N$_4$ dielectric film 63, a film of a GeSbTe phase change material 64, Si$_3$N$_4$ dielectric film 65, a ZnS—SiO$_2$ mixed dielectric film 66 and an Al alloy reflective film 67, looking from the light incident side, as shown in FIG. 30. These are formed on the supporting substrate 68. The first information recording layer is layered on the second information recording layer via the intermediate layer 57.

The optical constants for the wavelength of 400 nm are such that the complex refractive index of Si was 4.96–0.48i, the refractive index of ZnS—SiO$_2$ is 2.32, the refractive index of Si$_3$N$_4$ is 2.32, the complex refractive index of GeSbTe crystal was 2.0–3.0i, the complex refractive index of the amorphous phase 55 was 3.0–2.0i and the complex refractive index of the Al alloy was 0.59–4.43i. As a result of calculations of the film thickness structure, employing these values, there was found a solution which met the condition shown in FIG. 2 at a film thickness of the Si semi-transparent film of 8 nm, a film thickness of the ZnS—SiO$_2$ mixed dielectric film of 70 nm, a film thickness of the film of the Si$_3$N$_4$ dielectric film of 10 nm, a film thickness of the film of the phase change material of 14 nm, a film thickness of the film of the Si$_3$N$_4$ dielectric film of 10 nm, a film thickness of the ZnS—SiO$_2$ mixed dielectric film of 20 nm and a film thickness of the Al alloy reflective film of 19 nm, looking from the light incident side. Specifically, the reflectance of the crystal phase, reflectance of the amorphous phase, the absorption rate of the crystal phase and the absorption rate of the amorphous phase were 6.8%, 28.0%, 69.0% and 56.9%, respectively.

A recording medium of the aforementioned film structure was formed by sputtering to enable recording and/or reproduction with the wavelength of 400 nm, a numerical aperture NA of the objective lens of 0.85, a linear speed of 8 m/sec and a pit length of 0.135 μm.

Example 3

The layered structure of the first information recording layer on the light incident side was a three-layer structure comprised of a ZnS—SiO$_2$ mixed dielectric film, a film of the GeSbTe phase change material and a ZnS—SiO$_2$ mixed dielectric film, looking from the light incident side, as in the Example 1 above.

The optical constants for the wavelength of 650 nm are such that the refractive index of ZnS—SiO$_2$ is 2.13, the complex refractive index of GeSbTe crystal was 4.1–3.2i and the complex refractive index of the amorphous phase was 3.8–1.6i. As a result of calculations of the film thickness structure, employing these values, there was found a solution which met the condition shown in FIG. 2 at a film thickness of the ZnS—SiO$_2$ mixed dielectric film of 60 nm, a film thickness of the film of the GeSbTe phase change material of 5 nm and a ZnS—SiO$_2$ mixed dielectric film of 170 nm, looking from the light incident side. Specifically, the reflectance of the crystal phase, reflectance of the amorphous phase, the absorption rate of the crystal phase, the absorption rate of the amorphous phase, the transmittance of the crystal phase and the transmittance of the amorphous phase were 3.2%, 7.3%, 41.9%, 24.6%, 54.9% and 68.1%, respectively.

Figure 31:
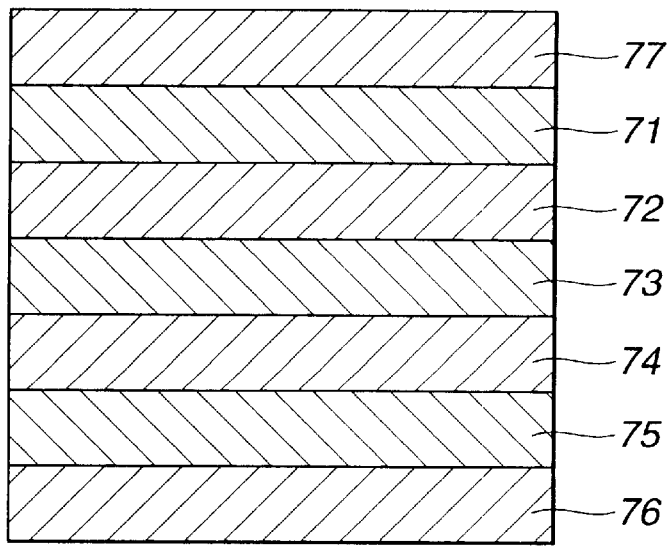
FIG. 31 is a schematic cross-sectional view showing still another example of a film structure of the second information recording layer.

The layered structure of the second information recording layer was of a five-layered structure comprised of an Au semi-transparent film 71, a ZnS—SiO$_2$ mixed dielectric film 72, a film of the GeSbTe phase change material 73, a ZnS—SiO$_2$ mixed dielectric film 74 and an Al alloy reflective film 75, looking from the light incident side, as shown in FIG. 31. These are formed on the supporting substrate 76. The first information recording layer is layered on the second information recording layer via intermediate layer 77.

The optical constants for the wavelength of 650 nm are such that the complex refractive index of Au was 0.19–3.5i, the refractive index of ZnS—SiO$_2$ is 2.13, the complex refractive index of GeSbTe crystal was 4.1–3.2i, the complex refractive index of the amorphous phase was 3.8–1.6i and the complex refractive index of the Al alloy was 1.7–6.0i. As a result of calculations of the film thickness structure, employing these values, there was found a solution which met the condition shown in FIG. 2 at a film thickness of the Au semi-transparent film of 10 nm, a film thickness of the ZnS—SiO$_2$ mixed dielectric film of 95 nm, a film thickness of the ZnS—SiO$_2$ mixed dielectric film of 50 nm and a film thickness of the Al alloy reflective film of 19 nm, looking from the light incident side. Specifically, the reflectance of the crystal phase, reflectance of the amorphous phase, the absorption rate of the crystal phase and the absorption rate of the amorphous phase were 9.8%, 30.8%, 73.2% and 48.8%, respectively.

A recording medium of the aforementioned film structure was formed by sputtering to enable recording and/or reproduction with the wavelength of 650 nm, a numerical aperture NA of the objective lens of 0.85, a linear speed of 4 m/sec and a pit length of 0.22 μm.

Example 4

The first information recording layer on the light incident side was of a five-layered structure comprised of a ZnS—SiO$_2$ mixed dielectric film, a Si$_3$N$_4$ dielectric film, a film of a GeSbTe phase change material, a Si$_3$N$_4$ dielectric film and a ZnS—SiO$_2$ mixed dielectric film, looking from the light incident side, as in Example 2 above.

The optical constants for the wavelength of 650 nm are such that the refractive index of ZnS—SiO$_2$ is 2.13, the refractive index of Si$_3$N$_4$ is 2.32, the complex refractive index of GeSbTe crystal was 4.1–3.2i and the complex refractive index of the amorphous phase was 3.8–1.6i. As a result of calculations of the film thickness structure, employing these values, there was found a solution which met the condition shown in FIG. 2 at a film thickness of the ZnS—SiO$_2$ mixed dielectric film of 50 nm, a film thickness of the Si$_3$N$_4$ film of 10 nm, a film thickness of the film of the phase change material of 5 nm, a film thickness of the film of the $Si_3N_4$ dielectric film of 10 nm and a $ZnS$—$SiO_2$ mixed dielectric film of 160 nm, looking from the light incident side. Specifically, the reflectance of the crystal phase, reflectance of the amorphous phase, the absorption rate of the crystal phase, the absorption rate of the amorphous phase were, the transmittance of the crystal phase and the transmittance of the amorphous phase were 3.2%, 7.3%, 41.9%, 24.6%, 54.9% and 68.1%, respectively.

Figure 32:
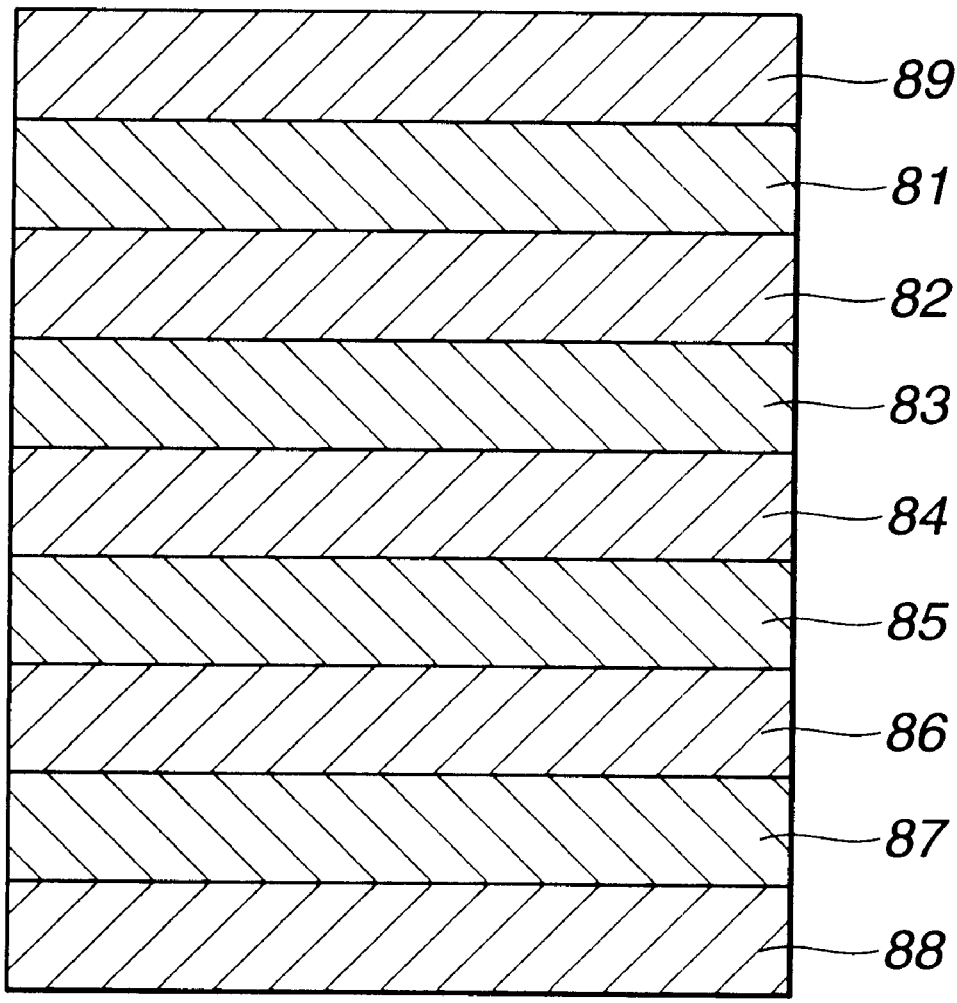
FIG. 32 is a schematic cross-sectional view showing yet another example of a film structure of the second information recording layer.

The second information recording layer was of a seven-layered structure comprised of an Au semi-transparent film 81, a $ZnS$—$SiO_2$ mixed dielectric film 82, a $Si_3N_4$ dielectric film 83, a film of a GeSbTe phase change material 84, $Si_3N_4$ dielectric film 85, a $ZnS$—$SiO_2$ mixed dielectric film 86 and an Al alloy reflective film 87, looking from the light incident side, as shown in FIG. 32. These are formed on the supporting substrate 88. The first information recording layer is layered on the second information recording layer via an intermediate layer 89.

The optical constants for the wavelength of 650 nm are such that the complex refractive index of Au was 0.19–3.5i, the refractive index of $ZnS$—$SiO_2$ is 2.13, the refractive index of $Si_3N_4$ is 2.13, the complex refractive index of GeSbTe crystal was 4.1–3.2i, the complex refractive index of the amorphous phase was 3.8–1.6i and the complex refractive index of the Al alloy was 1.7–6.0i. As a result of calculations of the film thickness structure, employing these values, there was found a solution which met the condition shown in FIG. 2 at a film thickness of the Au semi-transparent film of 10 nm, a film thickness of the $ZnS$—$SiO_2$ mixed dielectric film of 85 nm, a film thickness of the film of the $Si_3N_4$ dielectric film of 10 nm, a film thickness of the film of the GeSbTe phase change material of 14 nm, a film thickness of the film of the $Si_3N_4$ dielectric film of 10 nm, a film thickness of the $ZnS$—$SiO_2$ mixed dielectric film of 40 nm and a film thickness of the Al alloy reflective film of 19 nm, looking from the light incident side. Specifically, the reflectance of the crystal phase, reflectance of the amorphous phase, the absorption rate of the crystal phase and the absorption rate of the amorphous phase were 9.8%, 30.80%, 73.2% and 48.8%, respectively.

A recording medium of the aforementioned film structure was formed by sputtering to enable recording and/or reproduction with the wavelength of 650 nm, a numerical aperture NA of the objective lens of 0.85, a linear speed of 10 m/sec and a pit length of 0.22 µm.

Example 5

In the present Example, the optical disc 21 is constituted by layering the information recording layers 23, 24, with the intermediate layer 25 in-between, as shown in FIG. 25. In the present Example, the supporting substrate 22 is a carbonate substrate 1.2 mm thick and a pattern of crests and recesses is formed as-one with the supporting substrate by injection molding. The pattern of the crests and recesses form a land/groove recording guide groove, having a track pitch of 0.9 µm.

In the present Example, the a reflecting film 23A of an Al alloy, a second enhancement film 23B by a $ZnS$—$SiO_2$ mixture, a second crystallization promoting film 23C by SiN, a film of the phase change material 23D by GeSbTeN, a first crystallization promoting film 23E by SiN, a first enhancement film 23F by a $ZnS$—$SiO_2$ mixture and a semi-transparent enhancement film 23G by an Au—Co alloy, are sequentially formed by a sputtering method to form an information recording layer 23. This information recording layer 23 was evenly irradiated with a light beam to crystallize the film of the phase change material 23D by way of executing an initializing processing.

The film thicknesses of the respective films were as follows:

reflecting film 23A: 20 nm
second enhancement film 23B: 45 nm
second crystallization promoting film 23C: 10 nm
film of the phase change material 23D: 14 nm
first crystallization promoting film 23E: 10 nm
first enhancement film 23F: 85 nm
semi-transparent enhancement film 23G: 11 nm.

Then, after coating an acrylic acid based UV light curable resin by spin coating, the resulting product was cured with a UV lamp to form an intermediate layer 25 having a thickness of 30 µm. A pattern of crests and recesses is formed at this time by the 2P method and, by this pattern, a guide groove for forming the land and groove in the information recording layer 24 was formed. Meanwhile, this guide groove was formed at a track pitch of 0.9 µm.

On the intermediate layer 25, there were sequentially formed a second enhancement film 24B by the $ZnS$—$SiO_2$ mixture, a second crystallization promoting film 24C by SiN, a film of a GeSbTeN phase change material 24D, a first crystallization promoting film 24E by SiN and a first enhancement film 24F by a $ZnS/SiO_2$ mixture, by a sputtering method.

The film thicknesses of the respective films were as follows:

second enhancement film 24B: 110 nm
second crystallization promoting film 24C: 10 nm
film of the phase change material 24D: 8 nm
first crystallization promoting film 24E: 10 nm
first enhancement film 24F: 100 nm.

Then, after coating an acrylic acid based UV light curable resin by spin coating, the resulting product was cured with a UV lamp to form the light transmitting layer 26. The information recording layer 24 was evenly illuminated by a laser beam to crystallize the film of the phase change material 24D. By way of performing the initializing processing. Meanwhile, the light transmitting layer 26 was prepared to a thickness of 70 µm.

In the present Example, the optical disc was accessed by the optical system configured as described above, to confirm the characteristics. In this optical system, the numerical aperture NA was 0.85, with the light beam being f a wavelength of 650 nm. On this optical disc 21, the desired information was recorded and reproduced with a pit length Of 0.23 µm and a linear speed of 10 m/s. The recorded information could be reproduced with a jitter not larger than 10%. With the pit length of 0.23 µm and the linear speed of 10 m/s, since the track pitch is 0.9 µm, the recording capacity of 16 GB could be procured in the upper and lower information recording layers 23, 24 with the optical disc with a diameter of 12 cm.

Figure 33:
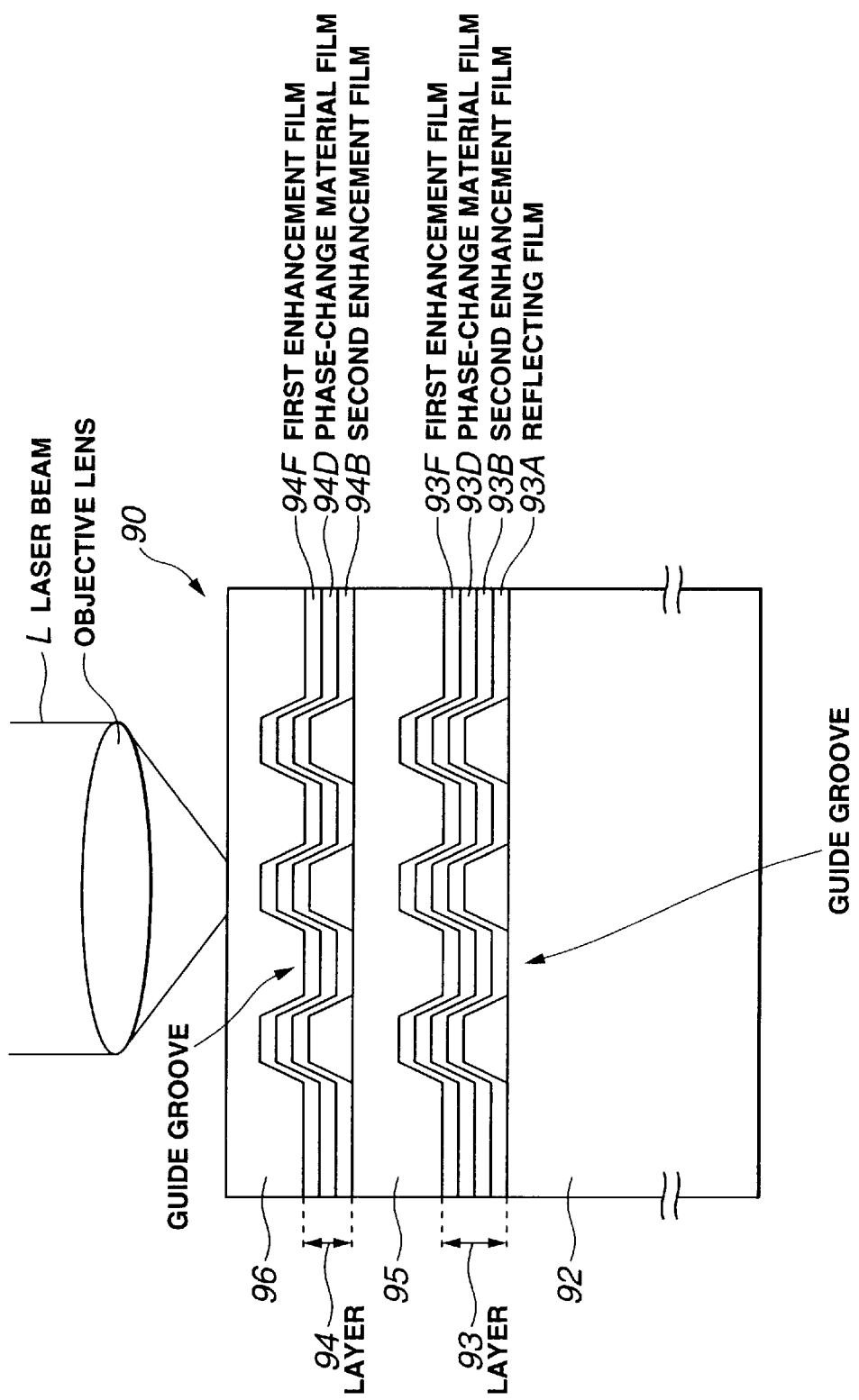
FIG. 33 is a cross-sectional view showing an optical disc used for comparison with the embodiments of the present invention.

In the present Example, an optical disc 90, configured as shown in FIG. 33, was accessed by way of comparison to the above-described optical disc 21 to confirm its characteristics.

With the present optical disc 90, a reflecting film 93A of an Al alloy, a second enhancement film 93B by the $ZnS$—$SiO_2$ mixture, a film of a phase change material 93D by GeSbTe and a first enhancement film 93F by the $ZnS$—$SiO_2$ mixture were sequentially formed by a sputtering method to form an information recording layer 93, which information recording layer 93 then was initialized by illumination of a light beam.

On the other hand, an intermediate layer 95 of the same structure and material as those of the optical disc 21 was prepared, and a reflecting film 93A by the Al alloy, a second enhancement film 93B by the ZnS—$SiO_2$ mixture, a film of the GeSbTe phase change material 93D and the first enhancement film 93F by the ZnS—$SiO_2$ mixture were sequentially formed on the intermediate layer 95 to form an information recording layer 94. Then, a light transmitting layer 96 similar to the light transmitting layer of the optical disc 21 was formed and initialized.

This optical disc 90 was evaluated in the same way as in evaluating the optical disc 21. It was found that rewriting with the pit length of 0.23 μm and the linear speed of 10 m/s was difficult, and that data recorded with an amount of jitter approximately equal to that with the optical disc 21 could be rewritten at the linear speed of 4 m/s, so that it was possible to evaluate the effect of, for example, the crystallization promoting film.

What is claimed is:

1. A multi-layered optical disc comprising layers in the following order:
    a light transmitting protective layer 10 μm to 177 μm in thickness;
    a first information recording layer including a first film of a phase change material;
    a transparent layer;
    a semi-transparent enhancement film;
    a second information recording layer including a second film of a phase change material;
    a reflecting film; and
    a support substrate 0.3 to 1.2 mm in thickness, the support substrate carrying a guide groove comprising a pattern of crests and recesses,
    where the second film of a phase change material has a layer of a crystallization promoting film followed by a layer of an enhancement film formed on at least one of its sides;
    the phase change material is formed of a binary alloy, a ternary alloy, a quaternary alloy, a quinary alloy, or nitrides and oxides thereof; and
    the crystallization promoting film is formed of a material containing at least one of Ge, GeC, Sn, SnC, Al, AlC, Ga, GaC, In, and InC, or chlorides and oxides thereof.

2. The multi-layered optical disc of claim 1, wherein the phase change material comprises InSe, SbSe, SbTe, InSbSe, GeSbTe, InSbTe, GbSbTeSe, AgInSbTe, and AgInSbSeTe.

3. The multi-layered optical disc according to claim 1 wherein the layer of a crystallization promoting film followed by the layer of an enhancement film are formed on the side of the second film of a phase the material opposite the reflecting film and further comprising an additional layer of enhancement film formed on the side of the second film of a phase change material adjacent the reflecting film.

4. The multi-layered optical disc according to claim 1 wherein the layer of a crystallization promoting film followed by the layer of an enhancement film are formed on the side of the second film of a phase change material adjacent the reflecting film and further comprising an additional layer of enhancement film formed on the side of the second film of a phase change material opposite the reflecting film.

5. The multi-layered optical disc according to claim 1 wherein the layer of a crystallization promoting film followed by the layer of an enhancement film are formed on the side of the second film of a phase change material adjacent the reflecting film and further comprising an additional layer of crystallization material followed by an additional layer of an enhancement film formed on the side of the second film of a phase change material opposite the reflecting film.

6. A multi-layered optical disc comprising layers in the following order:
    a light transmitting protective layer 10 μm to 177 μm in thickness;
    a first information recording layer including a first film of a phase change material;
    a transparent layer;
    a semi-transparent enhancement film;
    a second information recording layer including a second film of a phase change material;
    a reflecting film; and
    a support substrate 0.3 to 1.2 mm in thickness, the support substrate carrying a guide groove comprising a pattern of crests and recesses,
    where the second film of a phase change material has a layer of a crystallization promoting film followed by a layer of an enhancement film formed on at least one of its sides;
    the phase change material is formed of a binary alloy, a ternary alloy, a quaternary alloy, a quinary alloy, or nitrides and oxides thereof; and
    wherein the crystallization promoting film is formed of a material containing at least one of Ge, GeC, Sn, SnC, Al, AlC, Ga, GaC, In, and InC or chlorides and oxides thereof and
    the enhancement film is formed of ZnS, ZnS—$SiO_2$, $SiO_2$, or $MgF_2$.

7. The multi-layered optical disc of claim 6, wherein the phase change material comprises InSe, SbSe, SbTe, InSbSe, GeSbTe, InSbTe, GbSbTeSe, AgInSbTe, and AgInSbSeTe.

8. The multi-layered optical disc according to claim 6 wherein the layer of a crystallization promoting film followed by the layer of an enhancement film are formed on the side of the second film of a phase change material opposite the reflecting film and further comprising an additional layer of enhancement film formed on the side of the second film of a phase change material adjacent the reflecting film.

9. The multi-layered optical disc according to claim 6 wherein the layer of a crystallization promoting film followed by the layer of an enhancement film are formed on the side of the second film of a phase change material adjacent the reflecting film and further comprising an additional layer of enhancement film formed on the side of the second film of a phase change material opposite the reflecting film.

10. The multi-layered optical disc according to claim 6 wherein the layer of a crystallization promoting film followed by the layer of an enhancement film are formed on the side of the second film of a phase change material adjacent the reflecting film and further comprising an additional layer of crystallization material followed by an additional layer of an enhancement film formed on the side of the second film of a phase change material opposite the reflecting film.

11. A multi-layered optical disc comprising layers in the following order:
    a light transmitting protective layer 10 μm to 177 μm in thickness;

a first information recording layer including a first film of a phase change material;

a transparent layer;

a semi-transparent enhancement film;

a second information recording layer including a second film of a phase change material;

a reflecting film; and a support substrate 0.3 to 1.2 mm in thickness, the support substrate carrying a guide groove comprising a pattern of crests and recesses, where the second film of a phase change material has a layer of a crystallization promoting film followed by a layer of an enhancement film formed on at least one of its sides;

the phase change material is formed of a binary alloy, a ternary alloy, a quaternary alloy, a quinary alloy, or nitrides and oxides thereof; and wherein the crystallization promoting film is formed of a material containing at least one of Ge, GeC, Sn, SnC, Al, AlC, Ga, GaC, In, and InC or chlorides and oxides thereof and the semi-transparent enhancement film comprises Au, AuCo, Si, Ag alloy, $SiO_x$, ZnS—$SiO_x$, Au—$SiO_x$, and Au—ZnS—$SiO_x$, wherein x is equal to or greater than 2.

12. The multi-layered optical disc of claim 11, wherein the phase change material comprises InSe, SbSe, SbTe, InSbSe, GeSbTe, InSbTe, GbSbTeSe, AgInSbTe, and AgInSbSeTe.

13. The multi-layered optical disc according to claim 11 wherein the layer of a crystallization promoting film followed by the layer of an enhancement film are formed on the side of the second film of a phase change material opposite the reflecting film and further comprising an additional layer of enhancement film formed on the side of the second film of a phase change material adjacent the reflecting film.

14. The multi-layered optical disc according to claim 11 wherein the layer of a crystallization promoting film followed by the layer of an enhancement film are formed on the side of the second film of a phase change material adjacent the reflecting film and further comprising an additional layer of enhancement film formed on the side of the second film of a phase change material opposite the reflecting film.

15. The multi-layered optical disc according to claim 11 wherein the layer of a crystallization promoting film followed by the layer of an enhancement film are formed on the side of the second film of a phase change material adjacent the reflecting film and further comprising an additional layer of crystallization material followed by an additional layer of an enhancement film formed on the side of the second film of a phase change material opposite the reflecting film.

16. A multi-layered optical disc comprising layers in the following order:

a light transmitting protective layer 10 µm to 177 µm in thickness;

a first information recording layer including a first film of a phase change material;

a transparent layer;

a semi-transparent enhancement film;

a second information recording layer including a second film of a phase change material;

a reflecting film; and a support substrate 0.3 to 1.2 mm in thickness, the support substrate carrying a guide groove comprising a pattern of crests and recesses, where the second film of a phase change material has a layer of a crystallization promoting film followed by a layer of an enhancement film formed on at least one of its sides;

the phase change material is formed of a binary alloy, a ternary alloy, a quaternary alloy, a quinary alloy, or nitrides and oxides thereof; and wherein the crystallization promoting film is formed of a material containing at least one of Ge, GeC, Sn, SnC, Al, AlC, Ga, GaC, In, and InC or chlorides and oxides thereof and wherein the crystallization promoting film is formed of a material containing at least one of Ge, GeC, Sn, SnC, Al, AlC, Ga, GaC, In, and InC or chlorides and oxides thereof; and the reflective film comprises Al alloy, BiSb alloy,Ag alloy, and Au alloy.

17. The multi-layered optical disc of claim 16, wherein the phase change material comprises InSe, SbSe, SbTe, InSbSe, GeSbTe, InSbTe, GbSbTeSe, AgInSbTe, and AgInSbSeTe.

18. The multi-layered optical disc according to claim 16 wherein the layer of a crystallization promoting film followed by the layer of an enhancement film are formed on the side of the second film of a phase change material opposite the reflecting film and further comprising an additional layer of enhancement film formed on the side of the second film of a phase change material adjacent the reflecting film.

19. The multi-layered optical disc according to claim 16 wherein the layer of a crystallization promoting film followed by the layer of an enhancement film are formed on the side of the second film of a phase change material adjacent the reflecting film and further comprising an additional layer of enhancement film formed on the side of the second film of a phase change material opposite the reflecting film.

20. The multi-layered optical disc according to claim 16 wherein the layer of a crystallization promoting film followed by the layer of an enhancement film are formed on the side of the second film of a phase change material adjacent the reflecting film and further comprising an additional layer of crystallization material followed by an additional layer of an enhancement film formed on the side of the second film of a phase change material opposite the reflecting film.

* * * * *